US011630063B2

(12) United States Patent
Arai

(10) Patent No.: US 11,630,063 B2
(45) Date of Patent: Apr. 18, 2023

(54) FLUORESCENCE IMAGING DEVICE

(71) Applicant: FUJIFILM Corporation, Tokyo (JP)

(72) Inventor: Yuki Arai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 359 days.

(21) Appl. No.: 17/016,419

(22) Filed: Sep. 10, 2020

(65) Prior Publication Data

US 2021/0072157 A1 Mar. 11, 2021

(30) Foreign Application Priority Data

Sep. 11, 2019 (JP) .............................. JP2019-165342

(51) Int. Cl.
*G01N 21/64* (2006.01)
*G01N 21/84* (2006.01)
*G02B 5/20* (2006.01)

(52) U.S. Cl.
CPC ..... *G01N 21/6456* (2013.01); *G01N 21/8483* (2013.01); *G02B 5/20* (2013.01)

(58) Field of Classification Search
CPC ........... G01N 21/6456; G01N 21/8483; G01N 21/6452; G01N 2021/6471; G02B 5/20
See application file for complete search history.

(56) References Cited

U.S. PATENT DOCUMENTS

| | | | |
|---|---|---|---|
| 6,646,678 B1 * | 11/2003 | Kobayashi | H04N 5/2256 348/E5.025 |
| 10,338,275 B1 * | 7/2019 | Acosta | H04N 5/238 |
| 2003/0214581 A1 * | 11/2003 | Ikami | G06T 5/00 348/86 |
| 2005/0018332 A1 | 1/2005 | Vizard et al. | |
| 2007/0121099 A1 * | 5/2007 | Matsumoto | G01N 21/6458 250/458.1 |
| 2009/0324048 A1 * | 12/2009 | Leevy | A61B 5/0059 378/62 |
| 2011/0059023 A1 * | 3/2011 | Tunnell | A61B 5/0059 424/9.1 |
| 2015/0316479 A1 * | 11/2015 | Thrush | G01N 21/6456 250/216 |
| 2016/0147058 A1 * | 5/2016 | Yamada | G02B 21/26 348/80 |
| 2018/0047325 A1 * | 2/2018 | Biwa | G09G 3/2003 |

FOREIGN PATENT DOCUMENTS

JP 2006528772 12/2006

* cited by examiner

*Primary Examiner* — Sang H Nguyen
(74) *Attorney, Agent, or Firm* — JCIPRNET

(57) ABSTRACT

A fluorescence imaging device includes a display unit that displays an operation screen receiving an operation input, and the display unit displays a setting operation screen including a parameter setting field in which a parameter relating to blue shift correction for correcting shade of a sample image caused by a difference in an incidence angle of fluorescence emitted from each sample at each position where the fluorescence is incident on an optical filter is to be set.

18 Claims, 14 Drawing Sheets

FIG. 16

| FLUORESCENT REAGENT | EXCITATION LIGHT | OPTICAL FILTER | BLUE SHIFT CORRECTION PARAMETER |
|---|---|---|---|
| Cy3 | 550 nm | 570 nm | 1.08 |
| Alexa 647 | 650 nm | 665 nm | 0.95 |
| CUSTOM | 650 nm | 665 nm | 1.07 |

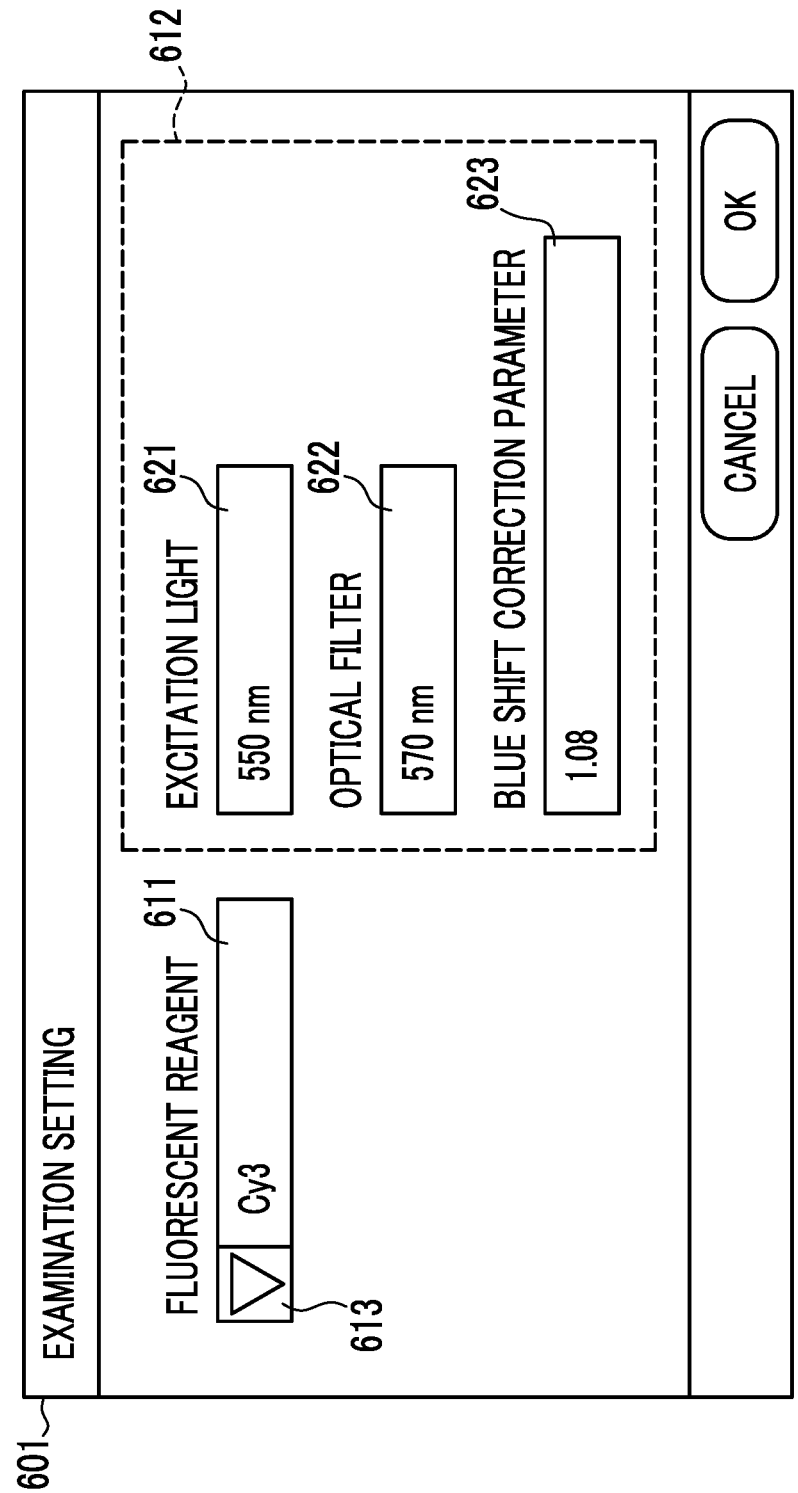

FLUORESCENCE IMAGING DEVICE

CROSS-REFERENCE TO RELATED APPLICATIONS

This application claims priority under 35 U.S.C § 119(a) to Japanese Patent Application No. 2019-165342 filed on 11 Sep. 2019. The above application is hereby expressly incorporated by reference, in its entirety, into the present application.

BACKGROUND OF THE INVENTION

1. Field of the Invention

The present invention relates to a fluorescence imaging device that images a sample using fluorescence.

2. Description of the Related Art

In the related art, there is a technique that uses fluorescence to observe samples, such as cells, nucleic acids, or microorganisms. Even though a sample itself does not emit fluorescence, the sample can be changed to a sample of which specific tissue emits fluorescence in a case where the specific tissue included in the sample is dyed using, for example, a fluorescent reagent.

A fluorescence imaging device is used for the observation of a sample that emits fluorescence as described above. The fluorescence imaging device comprises a light source that emits excitation light with which a sample is to be irradiated, and an imaging unit that images the sample using fluorescence emitted from the sample in a case where the sample is irradiated with the excitation light. Further, there is a case where the fluorescence imaging device comprises an optical filter, such as a band-pass filter, to image the sample with a high accuracy using fluorescence emitted from the sample. For example, a fluorescence imaging device disclosed in JP2006-528772A (corresponding to US2005/0018332A1) includes a band-pass filter and a high-pass filter.

SUMMARY OF THE INVENTION

The fluorescence imaging device tends to increase in size to collectively image a plurality of samples. For this reason, it is desired that the fluorescence imaging device is reduced in size.

Further, an optical filter formed using a dielectric multilayer film has a directional property due to the structure thereof, and exhibits expected performance in a case where light is incident on the optical filter so as to be substantially perpendicular to the optical filter. In a case where the optical filter formed using a dielectric multilayer film is used for the fluorescence imaging device, fluorescence emitted from the samples needs to be incident on the optical filter after being converted into parallel light. For this reason, an imaging optical system is likely to increase in size. As a result, the use of the optical filter formed using a dielectric multilayer film is one of causes that hinder a reduction in the size of the fluorescence imaging device.

On the other hand, in a case where fluorescence emitted from the samples is not converted into parallel light and an optical filter consisting of a dielectric multilayer film is disposed and used at a position where the fluorescence emitted from the samples is non-parallel light, the imaging optical system and the fluorescence imaging device can be reduced in size but fluorescence emitted from some samples is obliquely incident on the optical filter. In a case where light is obliquely incident on the optical filter, the optical filter does not exhibit the expected performance and the effective transmission characteristics thereof are changed with respect to the light. Specifically, "blue shift" where transmission characteristics are shifted to a short wavelength side according to an incidence angle occurs. Since the blue shift occurs, there is a new problem that an artifact is caused in the amount of light to be detected according to the position of the sample in a case where fluorescence emitted from the samples is not converted into parallel light and the optical filter consisting of a dielectric multilayer film is used.

Accordingly, an object of the invention is to provide a fluorescence imaging device that can be formed to be small and can reduce an artifact caused by blue shift.

A fluorescence imaging device according to an aspect of the invention comprises a display unit that displays an operation screen receiving an operation input, and the display unit displays a setting operation screen including a parameter setting field in which a parameter relating to blue shift correction for correcting shade of a sample image caused by a difference in an incidence angle of fluorescence emitted from each sample at each position where the fluorescence is incident on an optical filter is to be set.

It is preferable that the setting operation screen includes a fluorescent reagent-specifying field in which a fluorescent reagent included in the sample is to be specified and the parameter relating to the blue shift correction is set for each fluorescent reagent.

It is preferable that the setting operation screen comprises an image display field in which the sample image not yet subjected to the blue shift correction is to be displayed.

It is preferable that the display unit displays the sample image, which is not yet subjected to the blue shift correction, in the image display field in a case where the parameter is not yet set in the parameter setting field and the display unit displays the sample image, which has been subjected to the blue shift correction, in the image display field in a case where the parameter has been set in the parameter setting field.

It is preferable that the parameter is a ratio of a pixel value of a central portion of the sample image and a pixel value of a peripheral edge portion of the sample image.

It is preferable that the optical filter includes a dielectric multilayer film selectively transmitting light in a specific wavelength range including the fluorescence and is disposed at a position where the fluorescence used for imaging is non-parallel light.

It is preferable that the fluorescence imaging device further comprises an image processing unit that performs shading correction for correcting shade of the sample image caused by characteristics of an imaging unit, which images the sample, and the blue shift correction on the sample image.

It is preferable that the image processing unit performs the blue shift correction and the shading correction on the sample image in stages in combination.

It is preferable that the display unit displays an imaging condition-setting screen including a fluorescent reagent-selection field receiving selection of the fluorescent reagent included in the sample.

It is preferable that, in a case where the fluorescent reagent included in the sample is selected in the fluorescent reagent-selection field, excitation light with which the sample is to be irradiated, the optical filter that is to be used for imaging, and the parameter relating to the blue shift correction are automatically selected according to the selected fluorescent reagent.

The fluorescence imaging device according to the aspect of the invention can be formed to be small and can reduce an artifact caused by blue shift.

BRIEF DESCRIPTION OF THE DRAWINGS

FIG. 16 is a table showing an aspect where a blue shift correction parameter is stored in a storage unit.

FIG. 21 is a diagram showing an example of an operation screen used for settings and the like relating to imaging.

DESCRIPTION OF THE PREFERRED EMBODIMENTS

Figure 1:
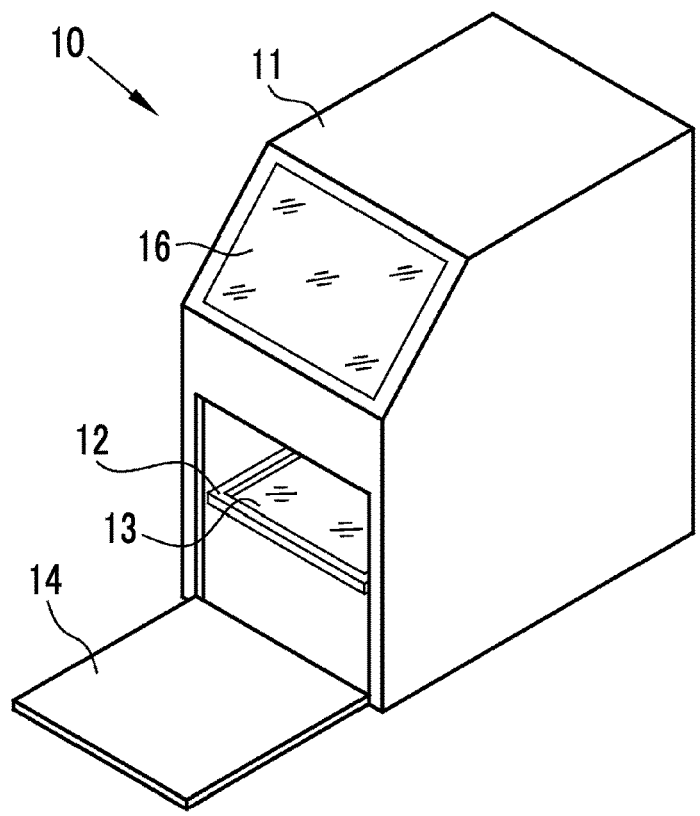
FIG. 1 is a perspective view showing the appearance of a fluorescence imaging device.

As shown in FIG. 1, a fluorescence imaging device 10 includes a housing 11 having an outward appearance where a part of a rectangular parallelepiped is cut out. The housing 11 houses a sample holder 12 and the like therein. The sample holder 12 allows one or a plurality of samples, which are objects to be observed, to be arranged in a plane and holds the samples. For example, the sample holder 12 is the form of a tray. As the sample holder 12, there are two types of sample holders, that is, a first sample holder of which a bottom 13 is made of transparent glass or the like and a second sample holder of which a bottom 13 is black and opaque. Any one of these sample holders is selected and used as the sample holder 12. The first sample holder of which the bottom 13 is transparent is used in a case where samples are imaged using light transmitted through the samples and the bottom 13 (so-called transmission imaging). Further, the second sample holder of which the bottom 13 is opaque is used in a case where samples are imaged using the reflected light, fluorescence, or the like of the samples. Furthermore, the sample holder 12 can be inserted into and removed from the housing 11 through an opening/closing part 14. The sample, which is used as an object to be observed by the fluorescence imaging device 10, is, for example, a living cell, a nucleic acid, a microorganism, or the like, and is an object that can emit at least fluorescence. In this embodiment, the sample includes one or more fluorescent reagents that emit fluorescence in a case where the fluorescent reagents are irradiated with excitation light 80 (see FIG. 4).

Further, the fluorescence imaging device 10 includes a display unit 16. The display unit 16 displays a user interface, such as an operation screen receiving operation inputs; a taken image; and the like. In this embodiment, the display unit 16 is a touch panel and also functions as an operation unit of the fluorescence imaging device 10. Accordingly, in a case where the display unit 16 displays an operation screen, a user can operate, set, and the like the fluorescence imaging device 10 by touching the display unit 16.

Figure 2:
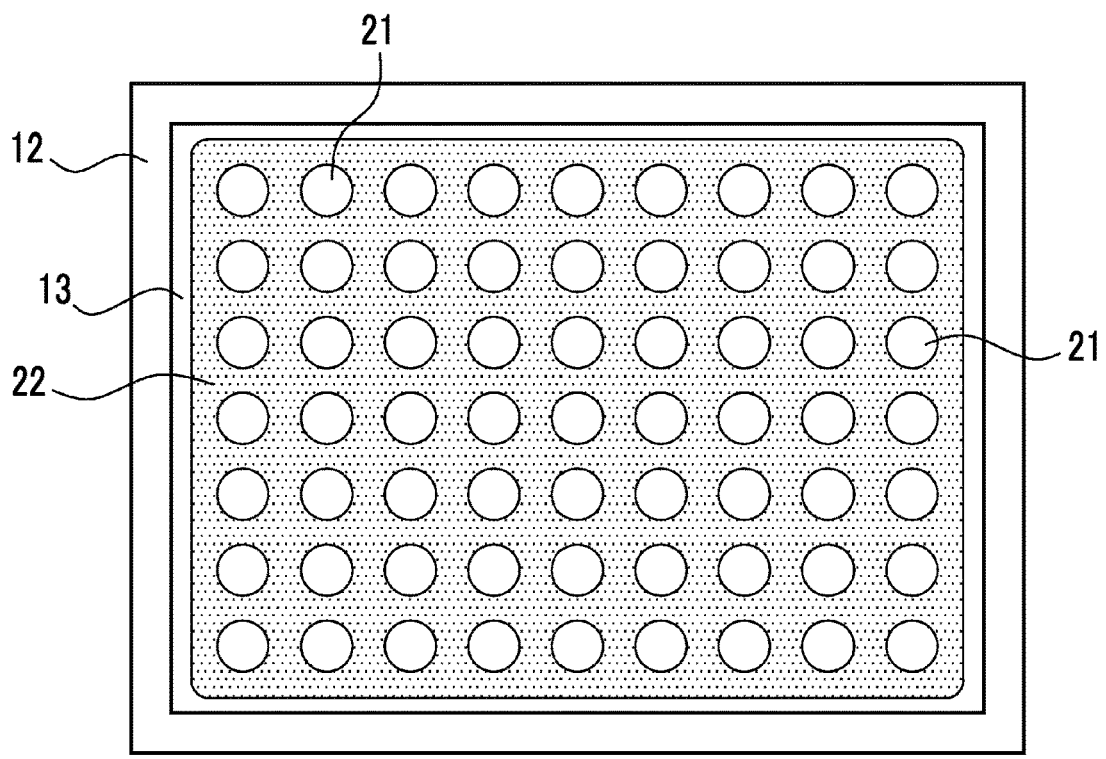
FIG. 2 is a diagram showing an aspect where a sample holder is used.

As shown in FIG. 2, the sample holder 12 can be used in a state where a microplate 22 where wells 21 in which samples are to be put are vertically and horizontally arranged in a predetermined array is placed on the sample holder 12. In addition, the sample holder 12 can be used in a state where samples formed in the form of a slide or the like are arranged in any array on the sample holder 12.

Figure 3:
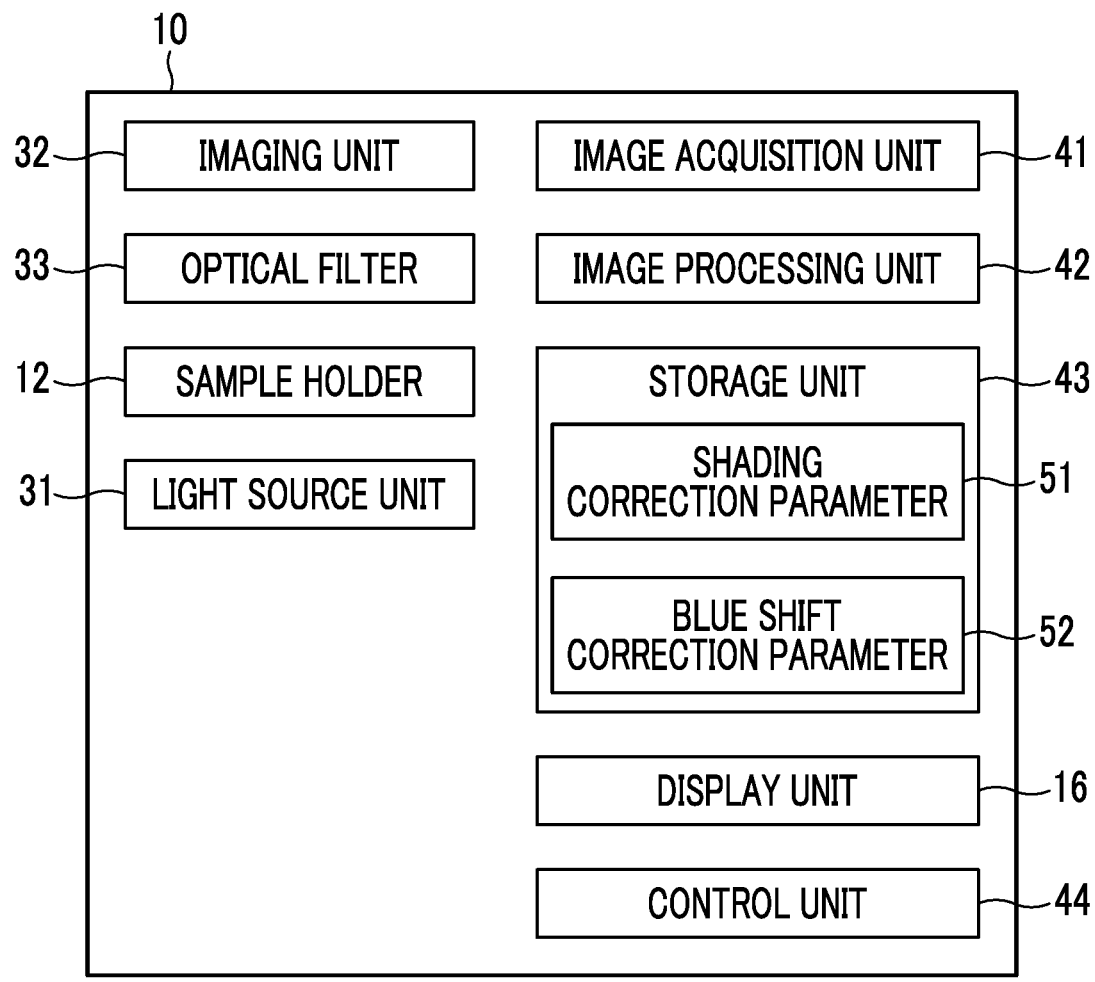
FIG. 3 is a block diagram showing the functions of the fluorescence imaging device.

As shown in FIG. 3, the fluorescence imaging device 10 comprises a light source unit 31, an imaging unit 32, an optical filter 33, an image acquisition unit 41, an image processing unit 42, a storage unit 43, a control unit 44, and the like in addition to the sample holder 12 and the display unit 16.

The light source unit 31 generates excitation light 80 that corresponds to the fluorescent reagent included in the sample. That is, the light source unit 31 includes a plurality of excitation light sources and can switch the wavelength range of the excitation light 80 according to the type of the fluorescent reagent included in the sample. The excitation light 80 corresponding to the fluorescent reagent means light that generates fluorescence caused by the fluorescent reagent. The excitation light source is, for example, a light emitting diode (LED), a gas lamp, or the like, and may be adapted to be combined with an optical filter that limits the wavelength range of light to be emitted as necessary. Further, the light source unit 31 can generate light other than the excitation light 80 according to an imaging mode. In a case where a sample is to be imaged using not fluorescence generated from the sample but transmitted light, scattered light, or reflected light, for example, the light source unit 31 can generate white light and the like regardless of the type of fluorescent reagent. In this embodiment, the fluorescence imaging device 10 images a sample using fluorescence emitted from the sample as long as not particularly mentioned.

The imaging unit 32 is a camera that includes all samples held by the sample holder 12 in an imaging range thereof. In a case where a sample is irradiated with the excitation light 80, the imaging unit 32 image the sample using fluorescence emitted from the sample. In a case where a sample is irradiated with light other than the excitation light 80, the imaging unit 32 can image the sample using transmitted light, scattered light, or reflected light of the sample. Further, the imaging unit 32 can adjust each of an imaging range, an imaging magnification, and a focal length.

The optical filter 33 is a filter that is used in a case where a sample is imaged using fluorescence emitted from the sample, and is formed using a dielectric multilayer film. The dielectric multilayer film of the optical filter 33 selectively transmits light in a specific wavelength range that includes fluorescence emitted from the sample. For example, the optical filter 33 is a band-pass filter that transmits fluorescence emitted from the sample and reduces or cuts off light in other wavelength ranges. The optical filter 33 can be formed of a high-pass filter that transmits light having a wavelength longer than a specific wavelength, a low-pass filter that transmits light having a wavelength shorter than a specific wavelength, a band-pass filter that transmits light in a specific wavelength range, or a combination of these filters. Further, there is a case where the optical filter 33 includes a dielectric multilayer film for reducing or cutting off light in the wavelength range of the excitation light 80.

Since the wavelength range of fluorescence emitted from the sample varies depending on the type of a fluorescent reagent, the fluorescence imaging device 10 includes a plurality of types of optical filters 33 according to the types of fluorescent reagents. Then, the fluorescence imaging device 10 selectively uses a required optical filter 33 among the plurality of optical filters 33 by settings or the like according to the type of a fluorescent reagent, that is, the wavelength range of fluorescence emitted from the sample. All the optical filters 33 can be removed from the optical path of the imaging unit 32 in the fluorescence imaging device 10. For example, in a case where samples are to be imaged using transmitted light or the like, the optical filter 33 is removed from the optical path of the imaging unit 32. Further, in a case where a sample is imaged using fluorescence emitted from the sample, one optical filter 33 is selected among the plurality of optical filters 33. However, a combination of two or more optical filters 33 can be used as necessary.

The image acquisition unit 41 acquires an image (hereinafter referred to as a sample image) that is obtained from the sample using the imaging unit 32, and the like. In a case where the sample holder 12 holds a plurality of samples, the image acquisition unit 41 acquires a sample image in which the plurality of samples held by the sample holder 12 appear. The sample image is an image that is used for the analysis or the like of the sample. Further, even in a case where the sample holder 12 holds no sample, the image acquisition unit 41 can perform imaging using the imaging unit 32 and acquire an image. For example, in a case where imaging is performed in a state where a calibration plate is placed on the sample holder 12, the image acquisition unit 41 can acquire a calibration image using the imaging unit 32. The calibration image is used to determine or change the parameters of image processing that is performed by the image processing unit 42.

The image processing unit 42 performs image processing, which corresponds to the type of a fluorescent reagent, on the sample image. The image processing, which is performed by the image processing unit 42, is shading correction, blue shift correction, and the like. The shading correction is image processing for correcting the shading of the sample image. Shading is an artifact of the shade of the sample image or the like caused by the characteristics of the imaging unit 32 regardless of the fluorescent reagent, and is caused by the use of a lens in the imaging unit 32 regardless of whether or not the optical filter 33 is used or the characteristics of the optical filter 33. The blue shift correction is image processing for correcting the artifact of the shade of the sample image that is caused by a difference in the incidence angle of fluorescence incident on the optical filter 33 at each position. More specifically, the artifact caused by blue shift appears in a form where a pixel value is reduced or increased over the peripheral edge portion from the central portion of the sample image according to the type of the fluorescent reagent. Accordingly, the blue shift correction is correction for increasing or reducing the pixel value over the peripheral edge portion from the central portion of the sample image on the contrary to this. Whether the pixel value is increased or reduced by the blue shift correction and the specific amount of increase or reduction thereof are changed according to the type of the fluorescent reagent.

The image processing unit 42 can perform one correction processing, which is a combination of the shading correction and the blue shift correction, on the sample image. In this embodiment, for the convenience of description, the image processing unit 42 performs the shading correction and the blue shift correction on the sample image in stages.

The storage unit 43 is a memory that stores control programs for controlling the respective parts of the fluorescence imaging device 10 and control parameters. For example, the storage unit 43 stores a parameter (hereinafter referred to as a shading correction parameter 51) relating to the shading correction and a parameter (hereinafter referred to a blue shift correction parameter 52) relating to the blue shift correction as the control parameters of the image processing performed by the image processing unit 42. Further, the control parameters, such as the shading correction parameter 51 and the blue shift correction parameter 52 stored in the storage unit 43, can be set and changed by calibration or the like.

The control unit 44 generally controls the respective parts of the fluorescence imaging device 10. For example, the control unit 44 causes the display unit 16 to display an operation screen that is used to receive operation inputs, and receives operation inputs. Then, the control unit 44 causes the respective parts of the fluorescence imaging device 10 to operate according to the received operation inputs. Specifically, with regard to fluorescence observation, the control unit 44 causes the display unit 16 to display a setting operation screen 401 (see FIG. 18) that is used to set the shading correction parameter 51 and the like, a setting operation screen 451 (see FIG. 19) that is used to set the blue shift correction parameter 52 and the like, an imaging condition-setting screen 601 (see FIG. 21) that is used to set imaging conditions required during imaging, and the like.

Figure 4:
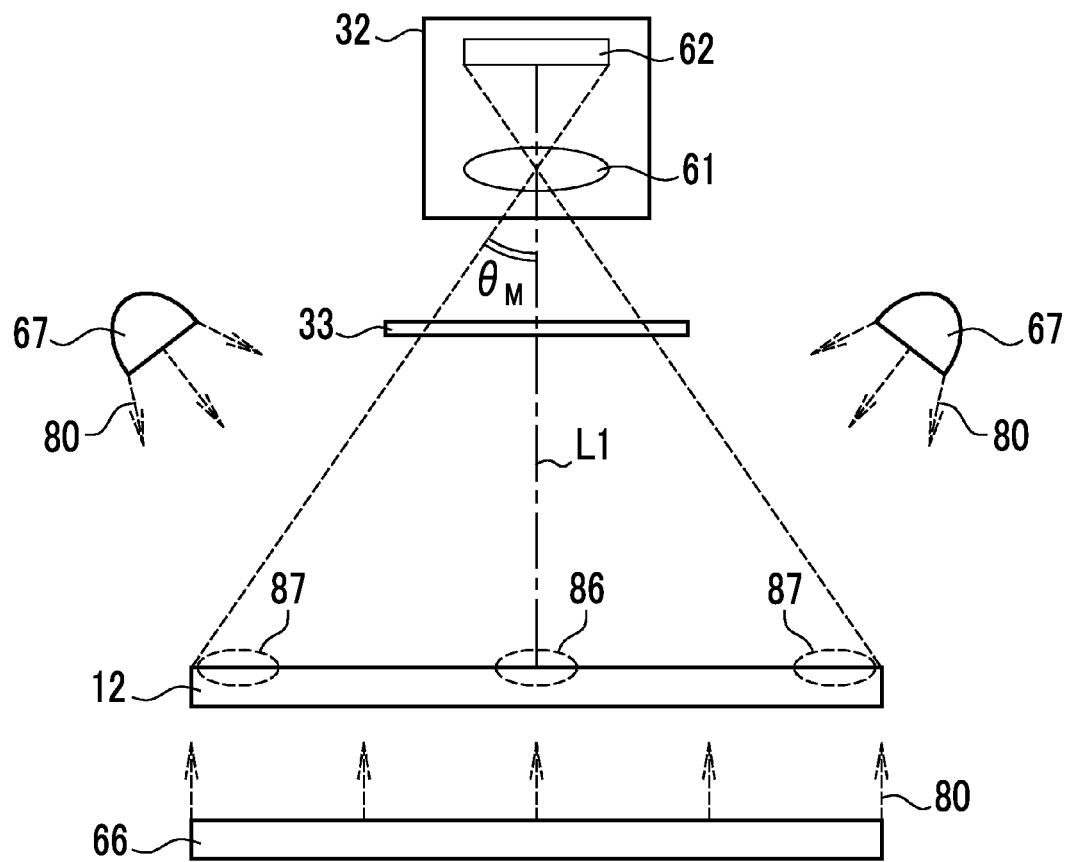
FIG. 4 is a diagram showing the optical configuration of the fluorescence imaging device.

As shown in FIG. 4, the imaging unit 32 faces the sample holder 12 and is disposed so that the center of the imaging range of the imaging unit 32 is aligned with a central portion 86 of the sample holder 12. Further, the imaging unit 32 can cause at least the entire sample holder 12 to be in the imaging range thereof. The imaging unit 32 includes a lens unit 61 and an imaging element 62. The lens unit 61 includes one or a plurality of lenses, and forms the image of the sample holder 12 on the imaging element 62. Furthermore, the lens unit 61 can adjust a focal length (focusing) and increase or reduce the size of the imaging range by moving some or all of the lenses thereof. There is a case where the lens unit 61 includes an optical filter as necessary. The imaging element 62 is, for example, a charge coupled device (CCD) image sensor, a complementary metal oxide semiconductor (CMOS) image sensor, or the like. The imaging element 62 can include a color filter as necessary.

Further, the light source unit 31 comprises two types of light sources, that is, a direct illumination light source 66 and indirect illumination light sources 67. The direct illumination light source 66 is disposed on the back side of the sample holder 12 (the side opposite to the sample holder 12 as viewed from the imaging unit 32), and illuminates the sample holder 12 from a position where illumination light can be directly incident on the imaging unit 32. Furthermore, the indirect illumination light sources 67 illuminate the sample holder 12 from positions where illumination light cannot be directly incident on the imaging unit 32. Both the direct illumination light source 66 and the indirect illumination light sources 67 can generate the excitation light 80 corresponding to the fluorescent reagent included in the sample. In this embodiment, the samples held by the sample holder 12 are irradiated with the excitation light 80 using the indirect illumination light sources 67.

The optical filter 33 is disposed at a position where fluorescence used for imaging by the imaging unit 32 is non-parallel light so that the surface of the optical filter 33 is perpendicular to an imaging optical axis L1 of the imaging unit 32. In this case, the imaging unit 32 is formed to be small in comparison with a case where fluorescence emitted from samples is adjusted to parallel light and the optical filter 33 is disposed at a position where the fluorescence emitted from samples is parallel light. This causes the fluorescence imaging device 10 to be formed to be small. In this embodiment, the optical filter 33 is disposed between the imaging unit 32 and the sample holder 12. For this reason, fluorescence emitted from the samples positioned at the central portion 86 of the sample holder 12 is incident on the optical filter 33 so as to be perpendicular to the optical filter 33. On the other hand, fluorescence emitted from the samples positioned at a peripheral edge portion 87 of the sample holder 12 is obliquely incident on the optical filter 33. For example, an angle $\theta_M$ at which fluorescence emitted from the samples positioned at the peripheral edge portion 87 is incident on the optical filter 33 is about 20°, and the fluorescence imaging device has an imaging range corresponding to an angle larger than that of a fluorescence imaging device in the related art.

Figure 5:
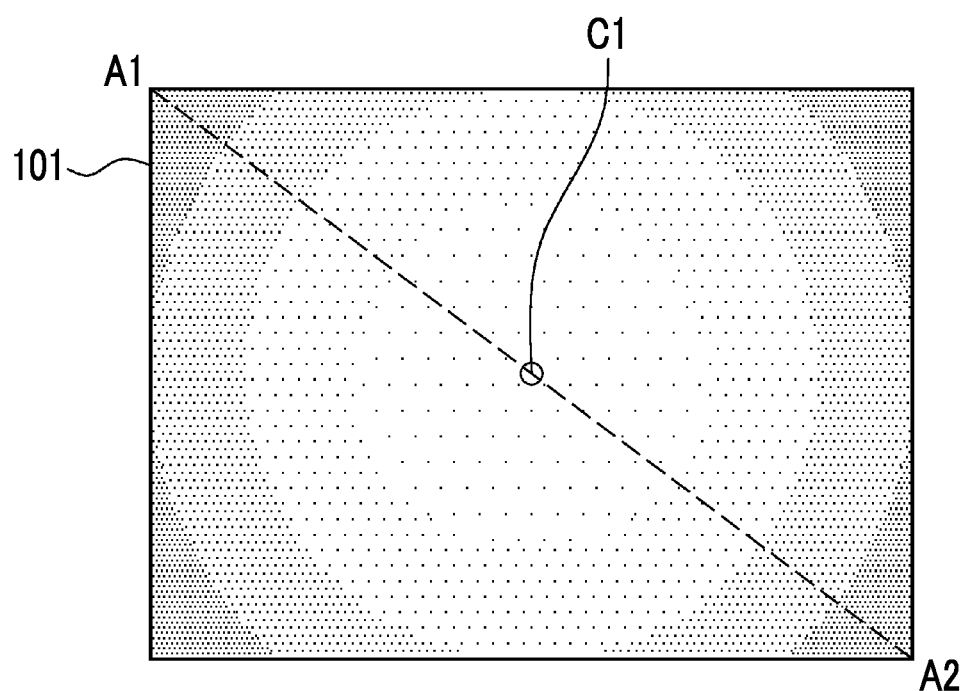
FIG. 5 is a shading image showing the aspect of shading.
Figure 6:
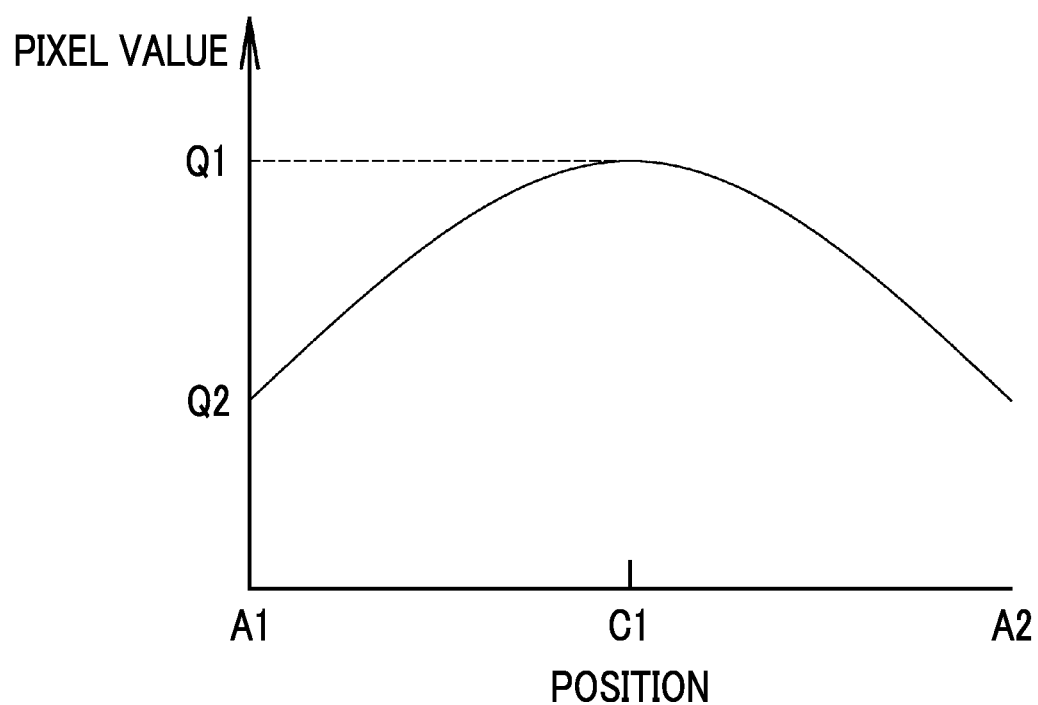
FIG. 6 is a graph showing the distribution of the pixel values of a shading image.

Since the imaging unit 32 of the fluorescence imaging device 10 performs imaging using the lens unit 61 as described above, shading is superimposed on the sample image. Specifically, as in a shading image 101 shown in FIG. 5, shading is an artifact that is the brightest at a central portion C1 and is darken according to a distance from the central portion C1 at positions away from the central portion C1 as with corners A1 and A2. That is, the pixel values Q2 of the diagonal corners A1 and A2 are smaller than the pixel value Q1 of the central portion C1 as shown in FIG. 6.

Figure 7:
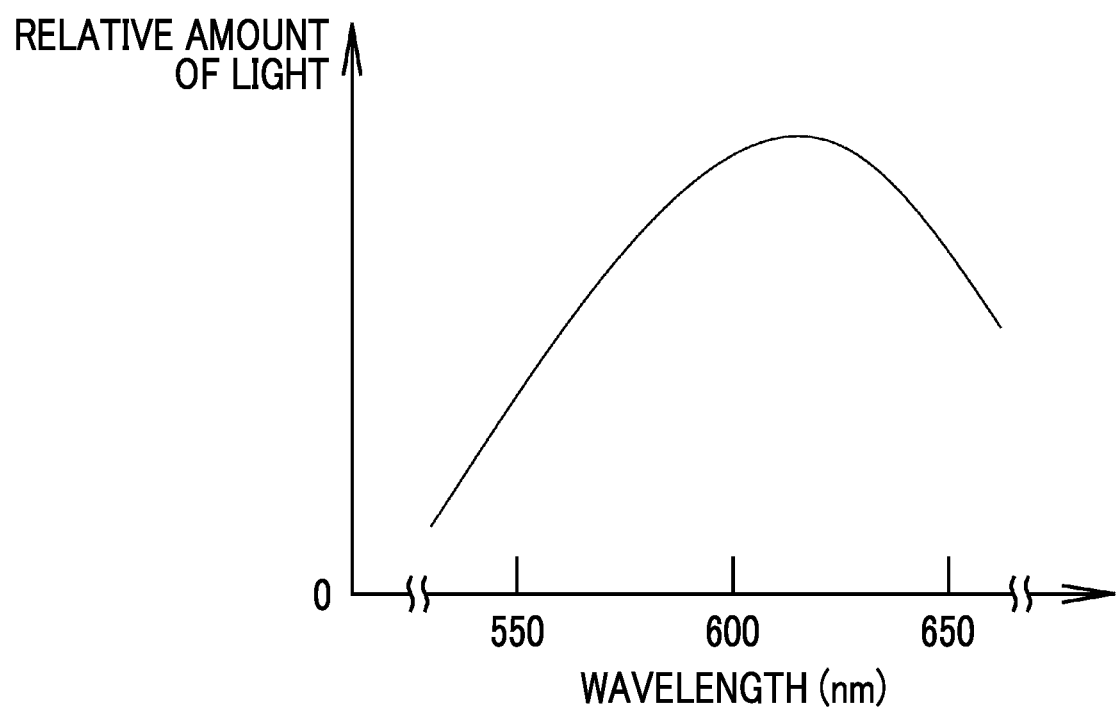
FIG. 7 is a graph showing the spectral characteristics of fluorescence emitted from a calibration plate.
Figure 8:
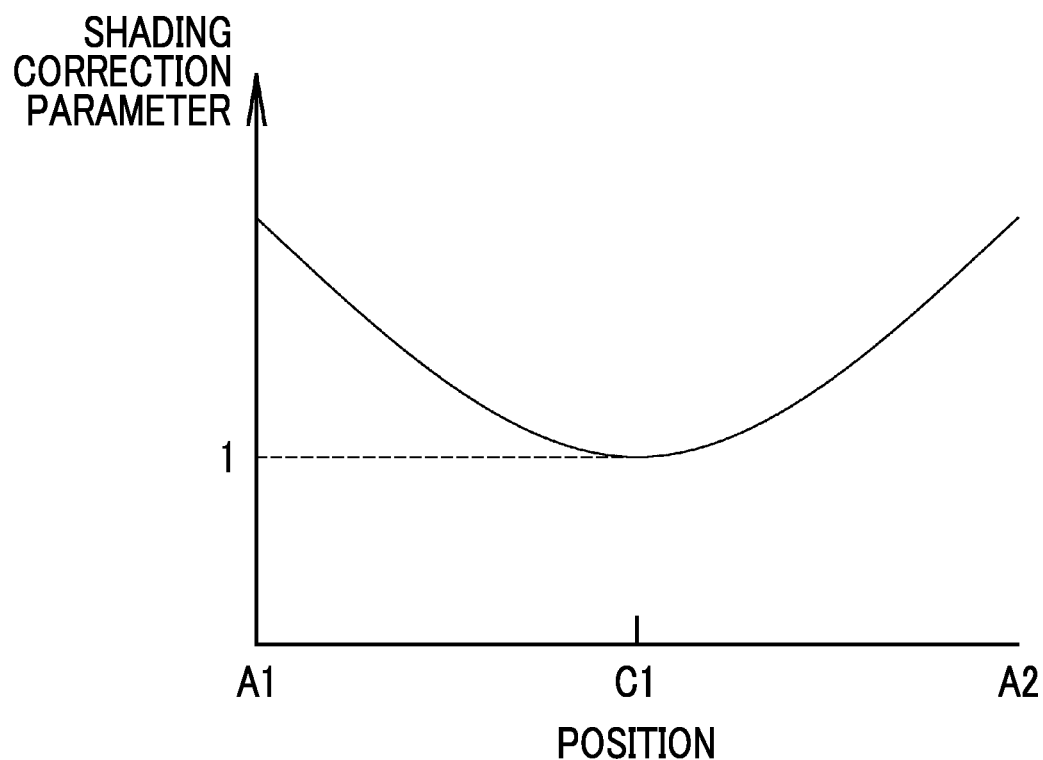
FIG. 8 is a graph showing a shading correction parameter.
Figure 9:
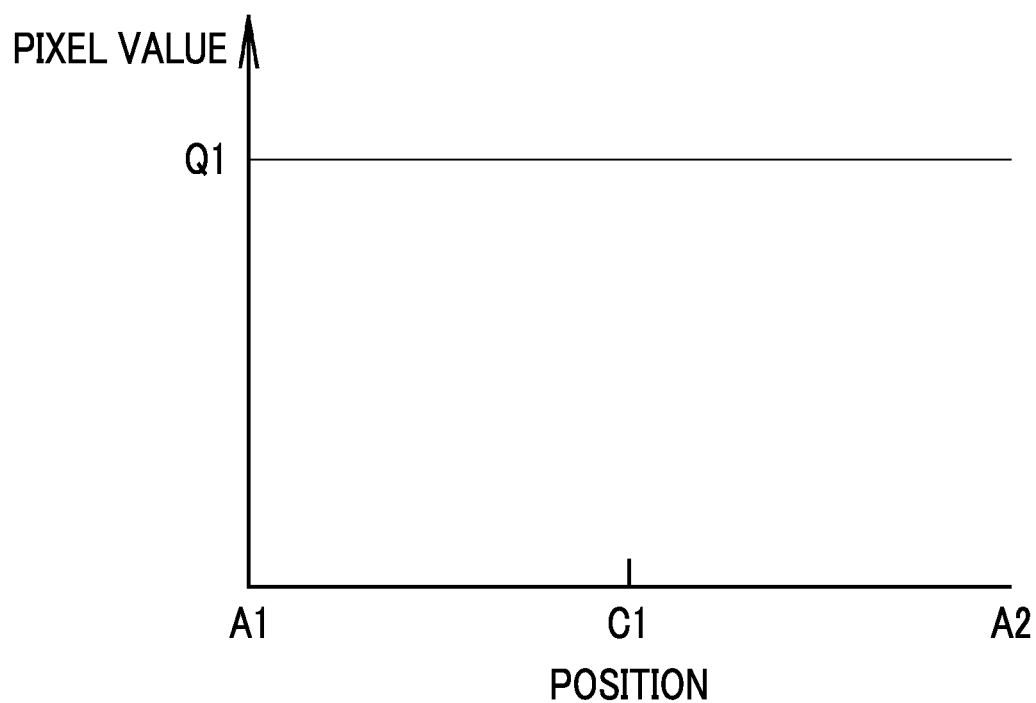
FIG. 9 is a graph showing the distribution of pixel values having been subjected to shading correction.

For this reason, in the fluorescence imaging device 10, a calibration plate that emits substantially green fluorescence as shown in FIG. 7 (a calibration plate that looks pink under visible light) is disposed on the sample holder 12 instead of samples and is imaged to obtain a shading image 101. Then, the shading correction parameter 51 depending on a position as shown in FIG. 8 is calculated on the basis of the distribution of the pixel values of the shading image 101 (see FIG. 6), and is stored in the storage unit 43 in advance. In a case where the image processing unit 42 performs the shading correction, the image processing unit 42 multiplies the sample image or the like by, for example, the shading correction parameter 51 to correct shading. For example, in a case where the shading image 101 is multiplied by the shading correction parameter 51, an image having a constant pixel value Q1 as shown in FIG. 9 can be obtained.

On the other hand, since the optical filter 33 is disposed at a position where fluorescence used for imaging by the imaging unit 32 is non-parallel light, the incidence angle of fluorescence, which is emitted from the sample and is incident on the optical filter 33, varies at each position. For this reason, the artifact of shade is generated in the sample image in the fluorescence imaging device 10 in addition to the shading.

Figure 10:
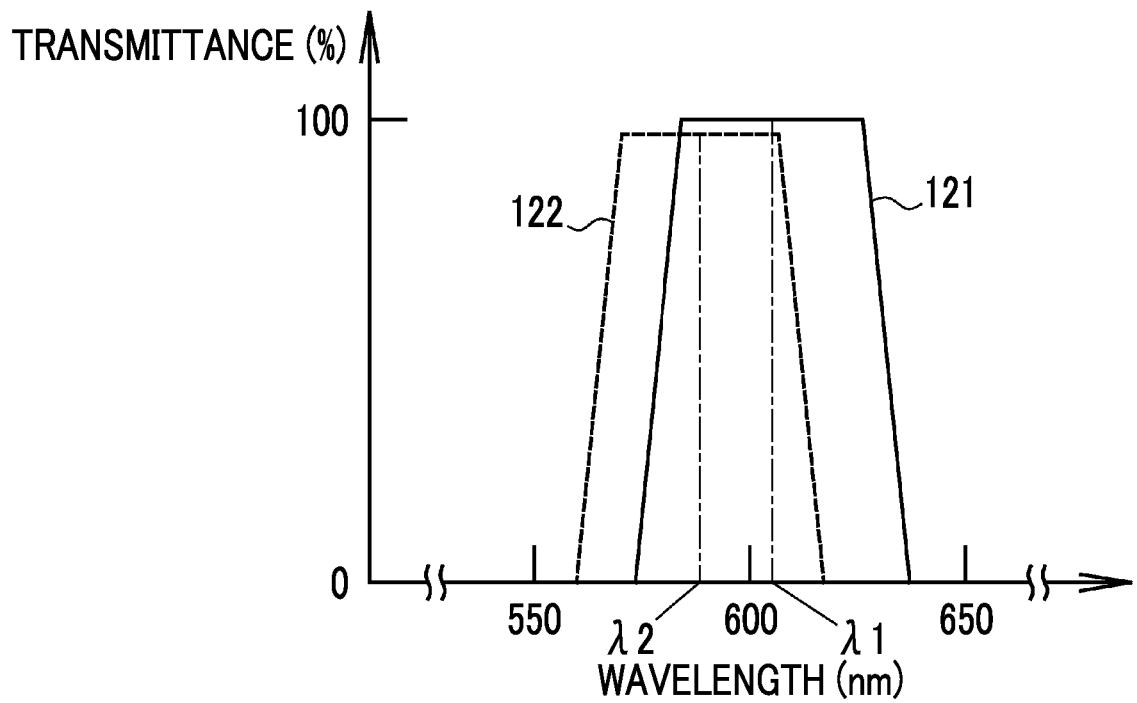
FIG. 10 is a graph showing the spectral transmission characteristics of an optical filter and an example of blue shift.

Specifically, since the optical filter 33 is formed of a dielectric multilayer film, blue shift where spectral transmission characteristics are shifted to a short wavelength side occurs as shown in FIG. 10. For example, fluorescence emitted from the samples positioned at the central portion 86 of the sample holder 12 is incident on the optical filter 33 so as to be perpendicular to the optical filter 33. In this case, the spectral transmission characteristics of the optical filter 33 correspond to a graph 121 and the central wavelength of the graph 121 is "$\lambda 1$". However, fluorescence emitted from the samples positioned at the peripheral edge portion 87 of the sample holder 12 is incident on the optical filter 33 at an angle $\theta_M$. For this reason, the spectral transmission characteristics of the optical filter 33 with respect to fluorescence emitted from the samples positioned at the peripheral edge portion 87 of the sample holder 12 are shifted to a short wavelength side as shown in a graph 122 in comparison with the graph 121 obtained in a case where fluorescence is incident on the optical filter 33 so as to be perpendicular to the optical filter 33, and the central wavelength of the graph 122 is "$\lambda 2$" ($<\lambda 1$).

Figure 11:
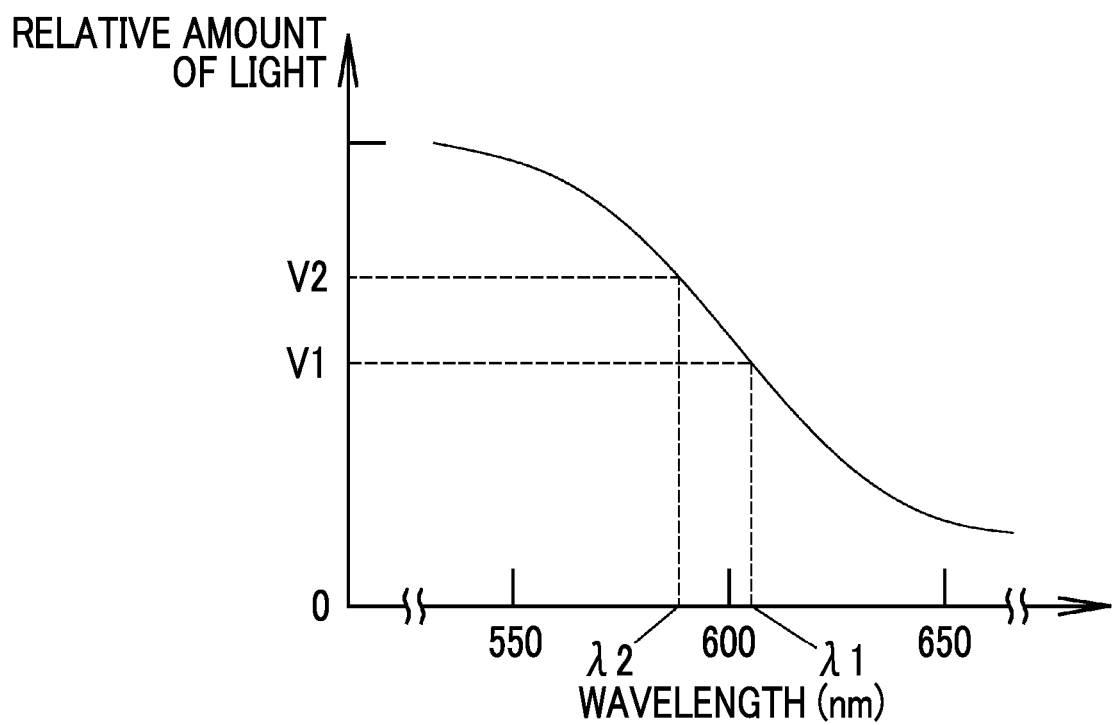
FIG. 11 is a graph showing the spectrum of fluorescence emitted from a sample using a first fluorescent reagent and a change in the amount of received fluorescence caused by blue shift.
Figure 12:
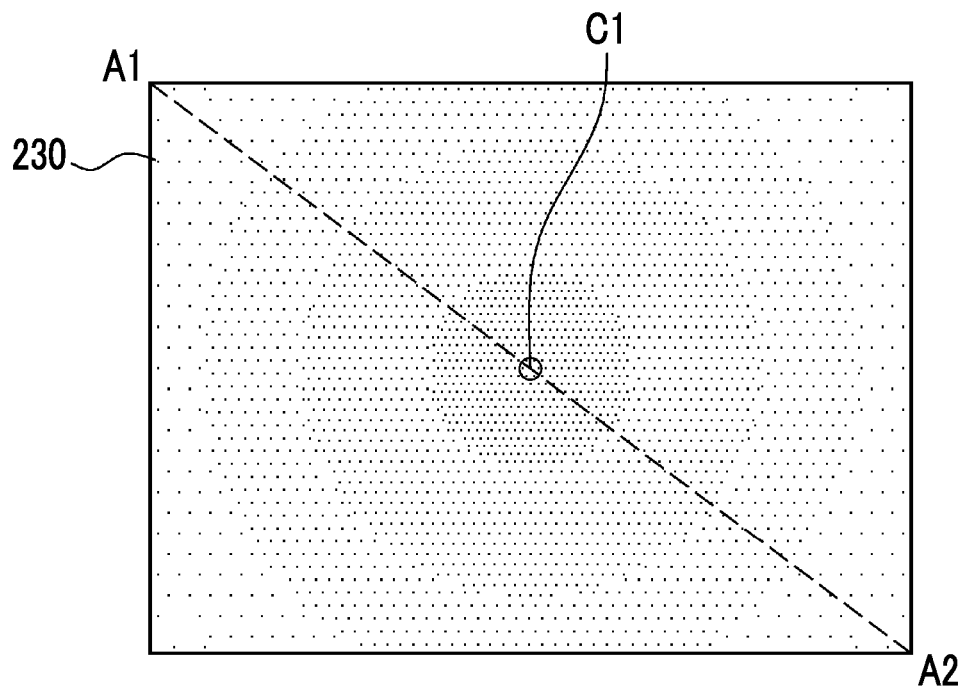
FIG. 12 is an image showing an example of an artifact caused by blue shift.
Figure 13:
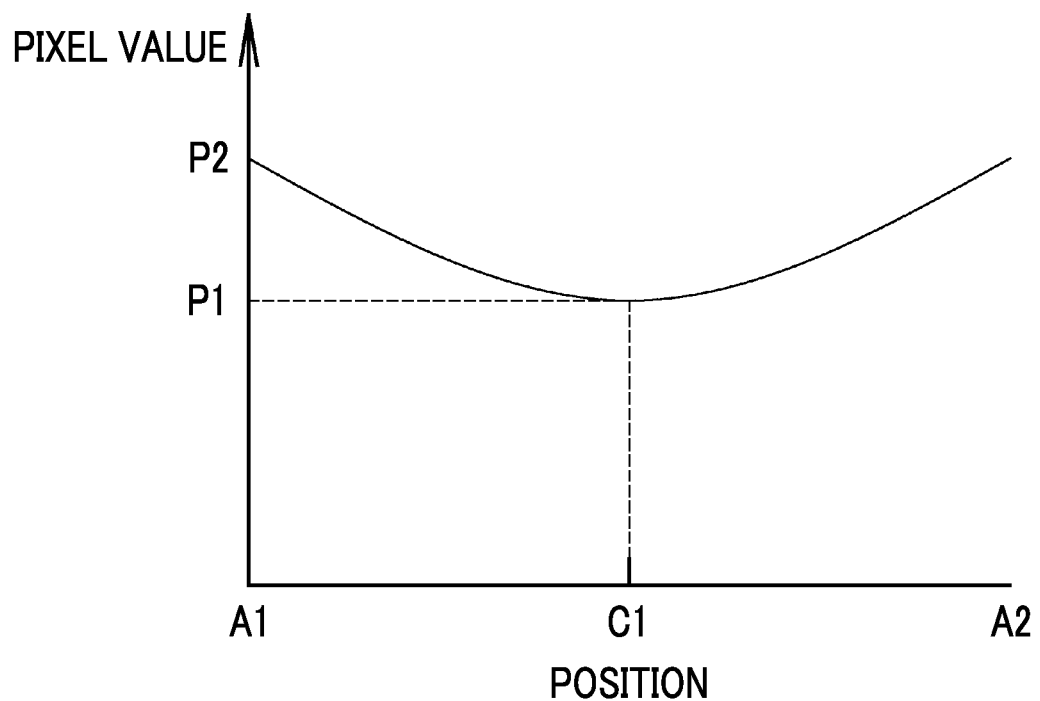
FIG. 13 is a graph showing the distribution of pixel values depending on an artifact caused by blue shift.

Further, the spectral characteristics of fluorescence emitted from a fluorescent reagent vary depending on the type of the fluorescent reagent. For example, samples using a certain specific fluorescent reagent (hereinafter referred to as a first fluorescent reagent) have spectral characteristics where the amount of light is monotonically reduced in the wavelength range of light transmitted by the optical filter 33 and in the vicinity thereof as shown in FIG. 11. For this reason, in a case where samples use the first fluorescent reagent, the amount of fluorescence, which is received by the imaging unit 32, of the amount V2 of fluorescence emitted from the samples positioned at the peripheral edge portion 87 of the sample holder 12 is larger than that of the amount V1 of fluorescence emitted from the samples positioned at the central portion 86 of the sample holder 12 due to the influence of blue shift even though the same amount of fluorescence is generated at the central portion 86 and the peripheral edge portion 87 of the sample holder 12. As a result, even in a case where there is no shading (or shading is corrected), an artifact caused by blue shift is superimposed on the sample image. For example, an artifact in which a pixel value is increased over the diagonal corners A1 and A2 from the central portion C1 is superimposed as in an image 230 shown in FIG. 12. Here, as shown in FIG. 13, the pixel values of the corners A1 and A2 are increased to "P2" due to blue shift in a case where the pixel value of the central portion C1 is "P1".

Figure 14:
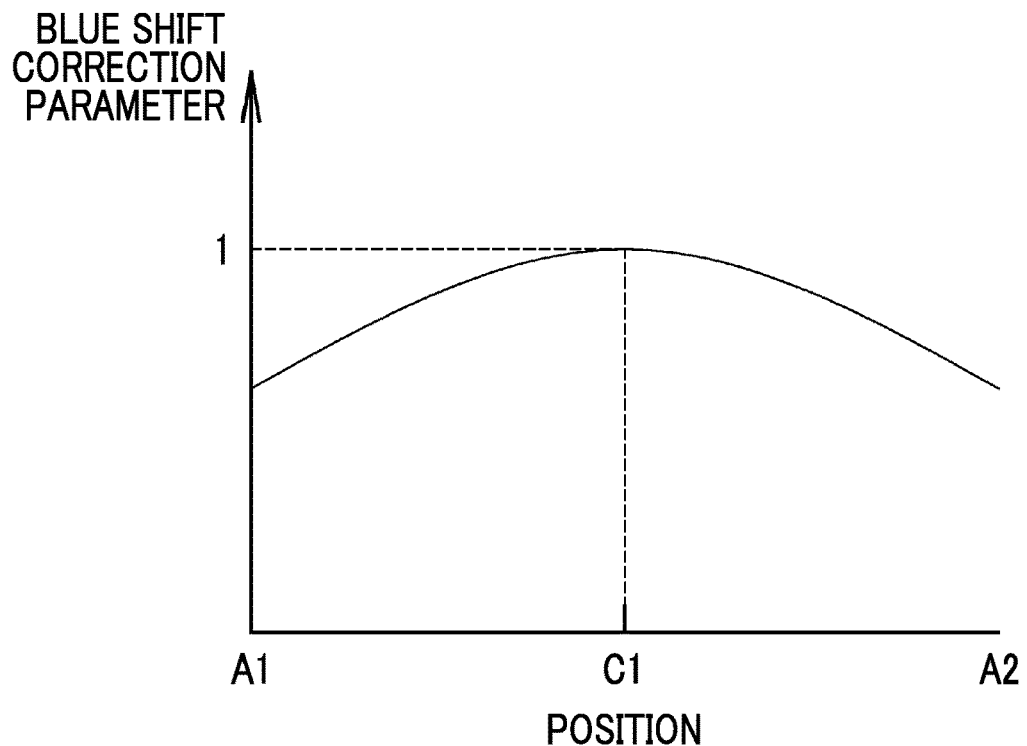
FIG. 14 is a graph showing an example of a blue shift correction parameter.

For this reason, as shown in FIG. 14, the storage unit 43 stores the blue shift correction parameter 52, which depends on an incident position at which the fluorescence emitted from the samples is incident on the optical filter 33, (that is, the incidence angles of the fluorescence) for the first fluorescent reagent. Further, in a case where samples use the first fluorescent reagent, the image processing unit 42 multiplies a sample image by coefficients, which are calculated using the blue shift correction parameter 52 corresponding to the first fluorescent reagent, according to positions in the sample image to perform the blue shift correction.

Figure 15:
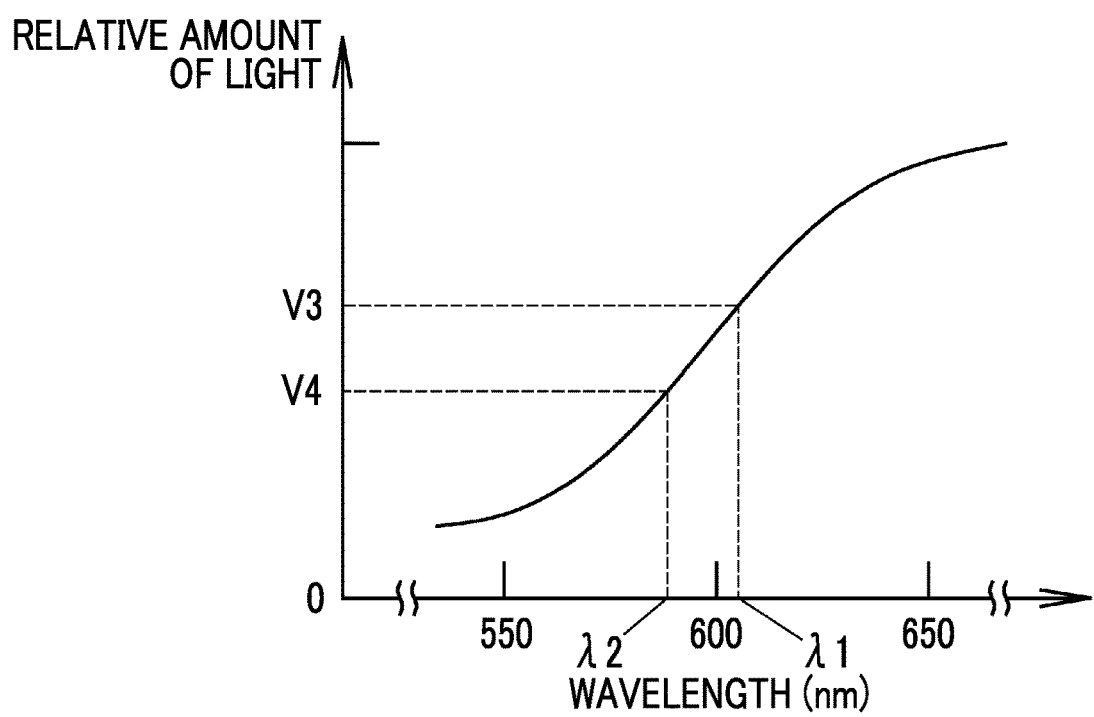
FIG. 15 is a graph showing the spectrum of fluorescence emitted from a sample using a second fluorescent reagent and a change in the amount of received fluorescence caused by blue shift.

Since there are a plurality of types of fluorescent reagents, an artifact, which is to be superimposed on a sample image according to the influence of blue shift, varies depending on each fluorescent reagent. For example, as shown in FIG. 15, a fluorescent reagent (hereinafter referred to as a second fluorescent reagent) different from the first fluorescent reagent has spectral characteristics where the amount of light is monotonically increased in the wavelength range of light transmitted by the optical filter 33 and in the vicinity thereof on the contrary to first fluorescent reagent. For this reason, in a case where samples use the second fluorescent reagent, the amount V4 of fluorescence emitted from the samples positioned at the peripheral edge portion 87 of the sample holder 12 is smaller than the amount V3 of fluorescence emitted from the samples positioned at the central portion 86 of the sample holder 12 due to the influence of blue shift even though the same amount of fluorescence is generated at the central portion 86 and the peripheral edge portion 87 of the sample holder 12. As a result, in a case where samples use the second fluorescent reagent, an artifact in which a pixel value is reduced over the diagonal corners A1 and A2 from the central portion C1 on the contrary to a case where samples use the first fluorescent reagent is superimposed.

Accordingly, as shown in FIG. 16, the storage unit 43 stores the blue shift correction parameter 52 for each fluorescent reagent. Since the storage unit 43 stores the blue shift correction parameter 52 for each fluorescent reagent, the image processing unit 42 can perform appropriate blue shift correction according to a fluorescent reagent to be used. As a result, since the optical filter 33 is disposed at a position where fluorescence used for imaging by the imaging unit 32 is non-parallel light, a sample image from which an artifact caused by blue shift is reduced or removed can be obtained even though blue shift occurs.

Further, the blue shift correction parameter 52 for each fluorescent reagent is stored in association with the type of an optical filter 33 that is used in a case where the fluorescent reagent is used. Since the amount of shift of a central wavelength, which is caused by blue shift, and the like vary depending on the type of the optical filter 33, more accurate blue shift correction can be performed in a case where the blue shift correction parameter 52 determined for a combination of a fluorescent reagent and an optical filter 33, which is used in a case where the fluorescent reagent is used, is used. Furthermore, the storage unit 43 stores the blue shift correction parameter 52 in association with the excitation light 80 (the types of excitation light sources). Even in a case where the same fluorescent reagent is used, there is a case where the spectral characteristics and the like of fluorescence to be generated vary depending on the excitation light 80 to be used. Accordingly, more accurate blue shift correction can be performed in a case where the blue shift correction parameter 52 determined for a combination of the fluorescent reagent and the excitation light 80 to be used is used.

In FIG. 16, the storage unit 43 stores "a ratio (for example, P2/P1 or P1/P2) of the pixel value of the central portion C1 of a sample image and the pixel value of the peripheral edge portion (for example, a corner A1 or A2) of the sample image" as the blue shift correction parameter 52 for each fluorescent reagent. An artifact caused by blue shift is changed in the form of a curve over the peripheral edge portion from the central portion C1 of the sample image (see FIG. 13). For this reason, it is preferable that the storage unit 43 stores a blue shift correction parameter 52 for each position in the sample image according to a curved change in a pixel value over the peripheral edge portion from the central portion C1 of the sample image in a case where each fluorescent reagent is used. However, with regard to many fluorescent reagents, a change in a pixel value, which is caused by blue shift over the peripheral edge portion from the central portion C1 of the sample image, can be approximated to each other in a case where a pixel value is linearly increased or reduced over the peripheral edge portion from the central portion C1. For this reason, a ratio of the pixel value of the central portion C1 of a sample image and the pixel value of the peripheral edge portion of the sample image is stored as the blue shift correction parameter 52 in this embodiment (FIG. 16). Accordingly, even in a case where there are a plurality of fluorescent reagents, a blue shift correction parameter 52 can be relatively easily specified or calibrated for each fluorescent reagent.

In a case where the fluorescence imaging device 10 having the above-mentioned configuration is used, a user arranges samples including a specific fluorescent reagent on the sample holder 12 and closes the opening/closing part 14 to form the inside of the housing 11 as a darkroom. After that, the user specifies the type of the fluorescent reagent used for the samples and gives an instruction to perform imaging to the control unit 44 through the operation screen displayed on the display unit 16. Accordingly, the control unit 44 disposes an optical filter 33, which corresponds to the type of the fluorescent reagent, among a plurality of optical filters 33 and causes the light source unit 31 to emit the excitation light 80 corresponding to the type of the fluorescent reagent. Therefore, since the samples held by the sample holder 12 emit fluorescence corresponding to the fluorescent reagent, the image acquisition unit 41 performs imaging using the imaging unit 32 and acquires a sample image 301. Two types of artifacts, that is, an artifact caused by shading and an artifact caused by blue shift are superimposed on the sample image 301.

Figure 17:
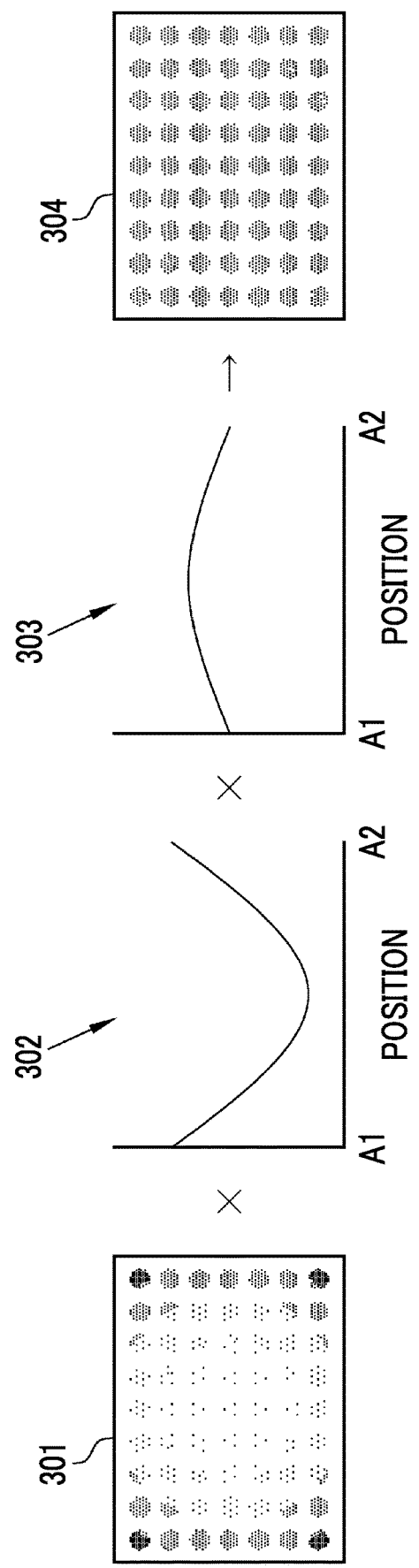
FIG. 17 is a diagram showing the actions of shading correction and blue shift correction.

For this reason, in a case where the image acquisition unit 41 acquires the sample image 301 in the fluorescence imaging device 10, the image processing unit 42 refers to the shading correction parameter 51 and the blue shift correction parameter 52 corresponding to fluorescent reagents and stored in the storage unit 43 and performs shading correction 302 and blue shift correction 303 on the acquired sample image 301 to obtain a corrected sample image 304 as shown in FIG. 17.

In a case where an optical filter 33 including a dielectric multilayer film is used, the imaging unit 32 (particularly, the lens unit 61) could not but be allowed to increase in size in the fluorescence imaging device in the related art to eliminate the influence of the blue shift of the optical filter 33. In contrast, the fluorescence imaging device 10 uses the optical filter 33 including the dielectric multilayer film as described above. Accordingly, in the fluorescence imaging device 10, fluorescence is not adjusted to parallel light and the optical filter 33 including the dielectric multilayer film is disposed at a position where fluorescence is non-parallel light. Therefore, since an optical element for adjusting fluorescence to parallel light is omitted in the fluorescence imaging device 10, the imaging unit 32 (particularly, the lens unit 61) is adapted to be small. As a result, the entire fluorescence imaging device 10 is formed to be small.

Further, since the optical filter 33 including the dielectric multilayer film is disposed at a position where fluorescence is non-parallel light, the fluorescence imaging device 10 can correct a harmful effect that the influence of blue shift cannot be ignored by blue shift correction that is performed according to the fluorescent reagent. For this reason, the fluorescence imaging device 10 can be formed to be small and can obtain the sample image 304 from which an artifact caused by blue shift is reduced. Accordingly, the fluorescence imaging device 10 is small, but can accurately measure the amount of fluorescence emitted from the samples and quantitatively measure and compare the amount of fluorescence emitted from the samples.

In a case where the optical filter 33 is to be disposed at the position of the incident pupil of the lens unit 61, the position of the optical filter 33 needs to be adjusted with an extremely high accuracy. In contrast, since the fluorescence imaging device 10 does not require so much high accuracy in the adjustment of the position of the optical filter 33, it is easy to select the optical filter 33 and to inserted and remove the optical filter 33 according to a fluorescent reagent. Further, since a fast lens having an F-Number of 1.0 or less (for example, F0.85) can be easily employed in the lens unit 61, there is also an advantage that a sample emitting a small amount of fluorescence can be imaged with a high accuracy. Furthermore, since the optical filter 33 is disposed at a position where fluorescence is non-parallel light, there is also an advantage that a lens capable of adjusting an imaging magnification or a focal length can be easily employed in the lens unit 61.

The shading correction parameter 51 is obtained from the imaging of the calibration plate (see FIG. 7) in this embodiment. The reason for this is that the shading correction parameter 51 cannot be accurately obtained since there are the individual differences in samples and the secular changes in samples and/or fluorescent reagents in a case where specific and practical samples, such as cells, nucleic acids, or microorganisms, are used. On the other hand, in a case where the shading correction parameter 51 is calculated using the calibration plate as described above, a calibration plate having completely the same characteristics as a specific and practical fluorescent reagent cannot be produced. Accordingly, an artifact caused by blue shift varying for each fluorescent reagent cannot be removed in shading correction. For this reason, in the fluorescence imaging device 10, the shading correction parameter 51 and the blue shift correction parameter 52 are individually obtained and the shading correction 302 and the blue shift correction 303 using these parameters are sequentially performed or one correction processing, which is a combination of the shading correction 302 and the blue shift correction 303, is performed. Since the fluorescence imaging device 10 individually holds the shading correction parameter 51 and the blue shift correction parameter 52 as described above, both the shading correction 302 and the blue shift correction 303 can be performed with a high accuracy.

Setting Operation for Shading Correction

Figure 18:
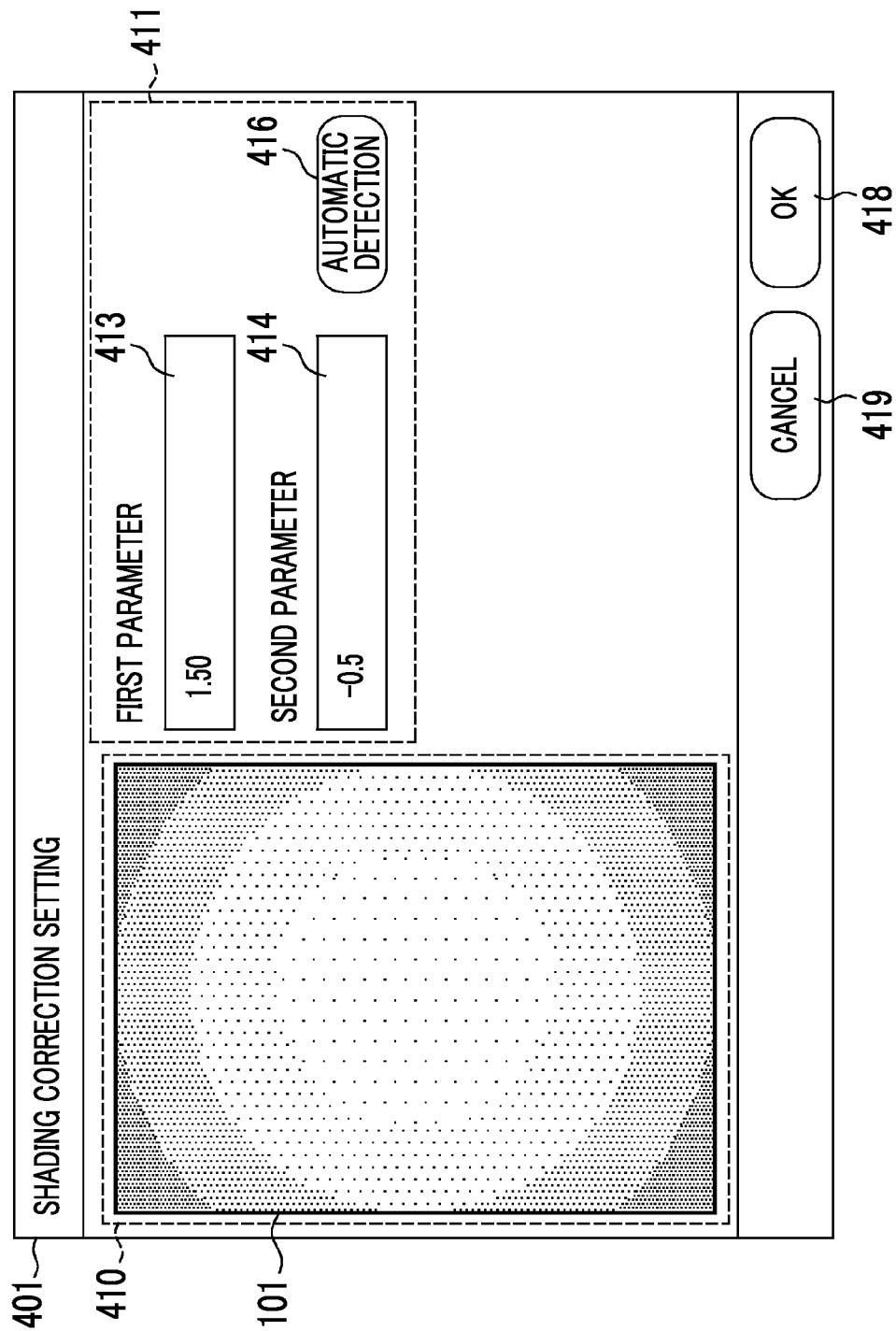
FIG. 18 is a diagram showing an operation screen that is used for settings and the like relating to shading correction.

In a case where the fluorescence imaging device 10 is operated in a calibration mode (for example, a calibration mode or a custom mode), the display unit 16 displays a setting operation screen 401 that is one of operation screens as shown in FIG. 18. The setting operation screen 401 is a user interface that is used to set or change the shading correction parameter 51, and includes an image display field 410 and a parameter setting field 411.

The image display field 410 is a field in which the shading image 101 as a calibration image obtained from the imaging of the calibration plate is to be displayed. In a case where the shading image 101 is taken, the display unit 16 displays the shading image 101 in the image display field 410.

The parameter setting field 411 is a field in which the shading correction parameter 51 is to be set. Here, the parameter setting field 411 includes a first parameter field 413 and a second parameter field 414, and the two-dimensional shape and degree of shading are determined by two parameters, that is, a first parameter input to the first parameter field 413 and a second parameter input to the second parameter field 414. That is, a set of the first parameter input to the first parameter field 413 and the second parameter input to the second parameter field 414 is the shading correction parameter 51.

Numerical values can be randomly input to the first parameter field 413 and the second parameter field 414. Further, in a case where the numerical values for the first and second parameter fields 413 and 414 are input (changed), the image processing unit 42 immediately performs shading correction on the shading image 101 using the input (changed) numerical values as the first and second parameters. Then, the control unit 44 updates the image displayed in the image display field 410 with an image having been subjected to the shading correction. Accordingly, an operator can check whether the first and second parameters are appropriate or not (whether the shading correction has been appropriately performed or not) by the display of the image display field 410.

Further, the first and second parameters can be automatically set in the fluorescence imaging device 10 instead of manually inputting or changing the first and second parameters as described above. In this case, the operator presses an automatic setting button 416 on the setting operation screen 401. In a case where the operator presses the automatic setting button 416, the control unit 44 automatically calculates the first and second parameters using the shading image 101 displayed in the image display field 410. Then, the first parameter calculated by the control unit 44 is input to the first parameter field 413 and the second parameter calculated by the control unit 44 is input to the second parameter field 414. Furthermore, the image processing unit 42 immediately performs shading correction on the shading image 101 using the first and second parameters that are calculated by the control unit 44. Then, the control unit 44 updates the image displayed in the image display field 410 with the shading image 101 having been subjected to the shading correction.

In a case where the operator presses an OK button 418 after the input or the like of the first and second parameters serving as the shading correction parameter 51 is appropriately performed as described above, the storage unit 43 stores the set of the first and second parameters as the shading correction parameter 51. In a case where the shading correction parameter 51 has already been set, the shading correction parameter 51 is updated with a newly set shading correction parameter 51. In a case where the operator presses a cancel button 419, the first and second parameters input on the setting operation screen 401 can be canceled. In this case, the storage unit 43 keeps the existing shading correction parameter 51.

Setting Operation Relating to Blue Shift Correction

Figure 19:
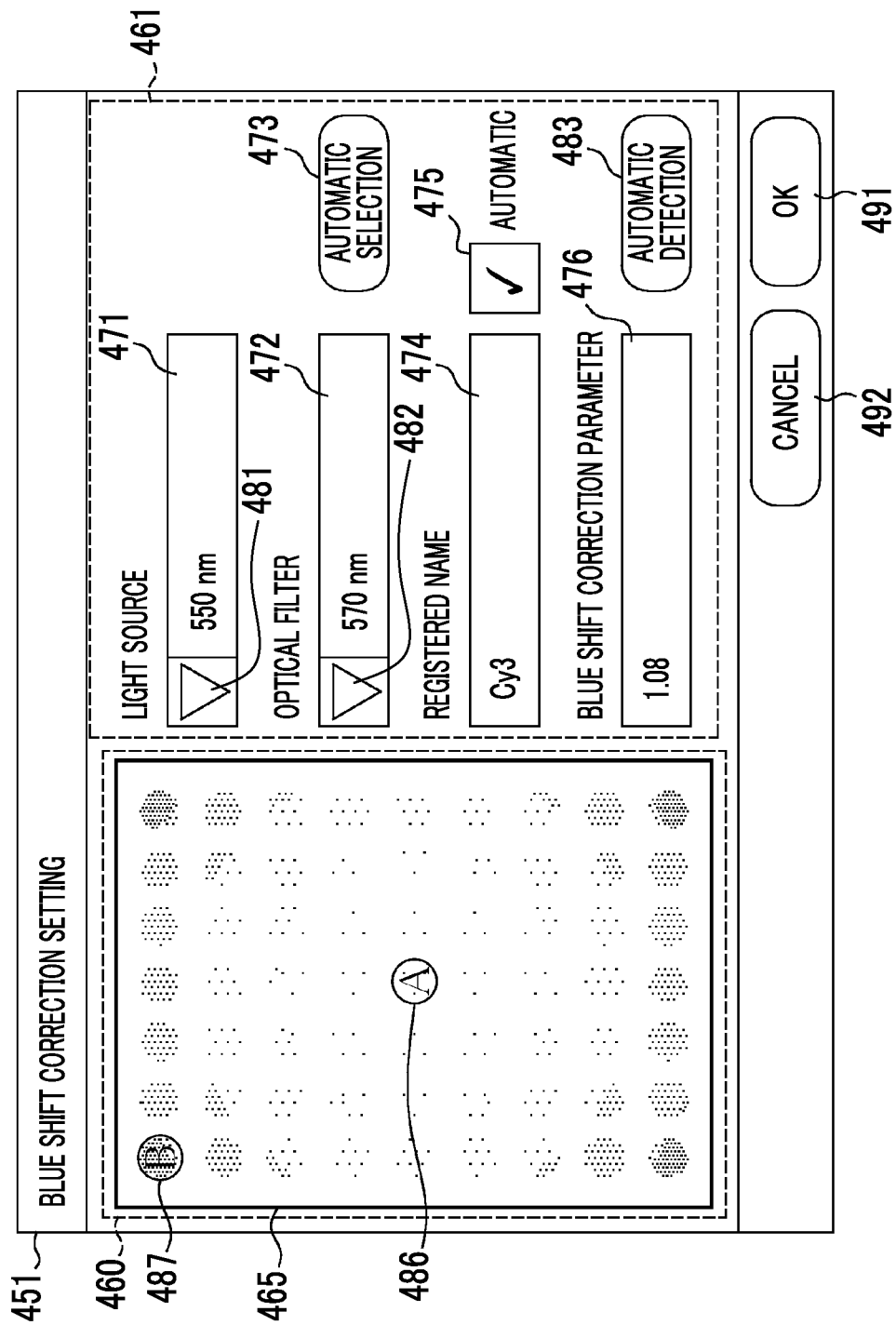
FIG. 19 is a diagram showing an example of an operation screen that is used for settings and the like relating to blue shift correction.

In a case where the fluorescence imaging device 10 is operated in the calibration mode, the display unit 16 displays a setting operation screen 451 that is one of operation screens as shown in FIG. 19. The setting operation screen 451 is a user interface that is used to set or change the blue shift correction parameter 52, and includes an image display field 460 and a parameter setting field 461.

The image display field 460 displays an image (hereinafter referred to as a blue shift image) 465 that is obtained in a case where shading correction is performed on a calibration sample image obtained from the imaging of a sample including a specific fluorescent reagent. The blue shift image 465 is a sample image that is subjected to the shading correction and is not yet subjected to the blue shift correction. In a case where the blue shift correction parameter 52 is not yet set in the parameter setting field 461, the display unit 16 displays a sample image, which is not yet subjected to the blue shift correction, in the image display field 460. Further, in a case where the blue shift correction parameter 52 has been set in the parameter setting field 461, the display unit 16 displays a sample image, which has been subjected to the blue shift correction, in the image display field 460. A case where the blue shift correction parameter 52 has been set in the parameter setting field 461 includes a case where the blue shift correction parameter 52 is changed in the parameter setting field 461 in addition to a case where the blue shift correction parameter 52 is newly set in the parameter setting field 461.

The parameter setting field 461 is a user interface that is used to set the blue shift correction parameter 52. Here, the parameter setting field 461 comprises a light source-selection field 471, an optical filter-selection field 472, a fluorescent reagent-specifying field 474, and a blue shift correction parameter-input field 476.

The light source-selection field 471 is a field in which a light source used to take the blue shift image 465, that is, the wavelength of the excitation light 80 is to be selected. The light source-selection field 471 displays the list of light sources (the wavelengths of the excitation light 80), which can be used in the fluorescence imaging device 10, by a pull-down menu 481 and allows the operator to select a light source (the wavelength of the excitation light 80) that is used to take the blue shift image 465 among the light sources.

The optical filter-selection field 472 is used to select an optical filter 33, which is used to take the blue shift image 465, using, for example, the central wavelength of the wavelength range of light that is transmitted by the optical filter 33. The optical filter-selection field 472 displays the list of optical filters 33, which can be used in the fluorescence imaging device 10, by a pull-down menu 482 and allows the operator to select an optical filter 33 that is used to take the blue shift image 465 among the light sources.

In a case where the operator presses the automatic selection button 473, the inputs of the light source-selection field 471 and the optical filter-selection field 472 can be automatically performed. In a case where the operator presses the automatic selection button 473, the control unit 44 specifies the light source (the wavelength of the excitation light 80) and the optical filter 33, which are used to take the blue shift image 465, in consideration of settings that are made in a case where the blue shift image 465 displayed in the image display field 460 is taken, and the like. Then, the control unit 44 automatically inputs the specified light source (the wavelength of the excitation light 80) to the light source-selection field 471 and automatically inputs the specified optical filter 33 to the optical filter-selection field 472.

The fluorescent reagent-specifying field 474 is a field in which a fluorescent reagent included in a sample is to be specified, and, for example, the registered name of a fluorescent reagent can be input to the fluorescent reagent-specifying field 474. For this reason, the blue shift correction parameter 52 is set for each fluorescent reagent on the setting operation screen 451. Further, a plurality of fluorescent reagents are registered in the fluorescence imaging device 10 in advance. For this reason, in a case where an automatic input checkbox 475 is set to ON and there is a fluorescent reagent registered for a combination of the wavelength of the excitation light 80 selected in the light source-selection field 471 and the optical filter 33 selected in the optical filter-selection field 472, the control unit 44 automatically inputs the registered name of that fluorescent reagent to the fluorescent reagent-specifying field 474. On the other hand, in a case where the automatic input checkbox 475 is set to OFF or a case where a fluorescent reagent registered for a combination of the wavelength of the excitation light 80 selected in the light source-selection field 471 and the optical filter 33 selected in the optical filter-selection field 472 is an unregistered fluorescent reagent, the operator inputs any registered name (for example, the name of the fluorescent reagent, or the like) to the fluorescent reagent-specifying field 474. In a case where the existing registered name is input to the fluorescent reagent-specifying field 474 on the setting operation screen 451 and the blue shift correction parameter 52 is changed, the blue shift correction parameter 52 relating to the existing fluorescent reagent can be changed (calibrated). Furthermore, in a case where an unregistered name or the like is input to the fluorescent reagent-specifying field 474 on the setting operation screen 451 and the blue shift correction parameter 52 is set, a blue shift correction parameter 52 relating to a new fluorescent reagent can be added to the storage unit 43.

The blue shift correction parameter-input field 476 is a field to which the blue shift correction parameter 52 is to be input. The operator can input any numerical value to the blue shift correction parameter-input field 476. In a case where a numerical value is manually input or changed in the blue shift correction parameter-input field 476, the image processing unit 42 immediately performs blue shift correction on the blue shift image 465 using the blue shift correction parameter 52 that is input to the blue shift correction parameter-input field 476, or the like. Then, the control unit 44 updates the image displayed in the image display field 460 with an image having been subjected to the blue shift correction. Accordingly, the operator can check whether the blue shift correction parameter 52 input to the blue shift correction parameter-input field 476 is appropriate or not (whether the blue shift correction has been appropriately performed or not) by the display of the image display field 460.

In a case where the blue shift correction parameter 52 is manually input as described above, the operator can refer to a pixel value at any point of the blue shift image 465. In a case where the operator selects a first point 486 denoted by "A" in the blue shift image 465, the display unit 16 displays the pixel value of the first point 486 in, for example, a pop-up manner. Likewise, in a case where the operator selects a second point 487 denoted by "B" in the blue shift image 465, the display unit 16 displays the pixel value of the second point 487 in, for example, a pop-up manner. For this reason, the operator can calculate the blue shift correction parameter 52 with reference to each of the pixel values of the first and second points 486 and 487 of the blue shift image 465. Here, the operator refers to the pixel values of the first and second points 486 and 487, that is, two points, but can also check the pixel values of three or more points.

Further, the blue shift correction parameter 52 can be automatically calculated. For example, in a case where the operator selects two or more points (for example, the first and second points 486 and 487) used for the calculation of the blue shift correction parameter 52 in the blue shift image 465 and presses an automatic detection button 483, the control unit 44 automatically calculates a blue shift correction parameter 52 using the pixel values of the selected points and automatically inputs the blue shift correction parameter 52 to the blue shift correction parameter-input field 476.

In a case where a blue shift correction parameter 52 is manually or automatically set and the operator checks that the blue shift correction is appropriately performed using the blue shift correction parameter 52 as described above, the operator presses an OK button 491. Accordingly, the storage unit 43 stores the blue shift correction parameter 52, which is set on the setting operation screen 451, in association with a fluorescent reagent, a light source (the wavelength of the excitation light 80), an optical filter 33, and the like. As a result, the storage unit 43 changes the blue shift correction parameter 52 or newly registers the blue shift correction parameter 52. The operator can cancel the blue shift correction parameter 52, which is input on the setting operation screen 451, and the like by pressing a cancel button 492. In this case, the storage unit 43 keeps the existing blue shift correction parameter 52.

Figure 20:
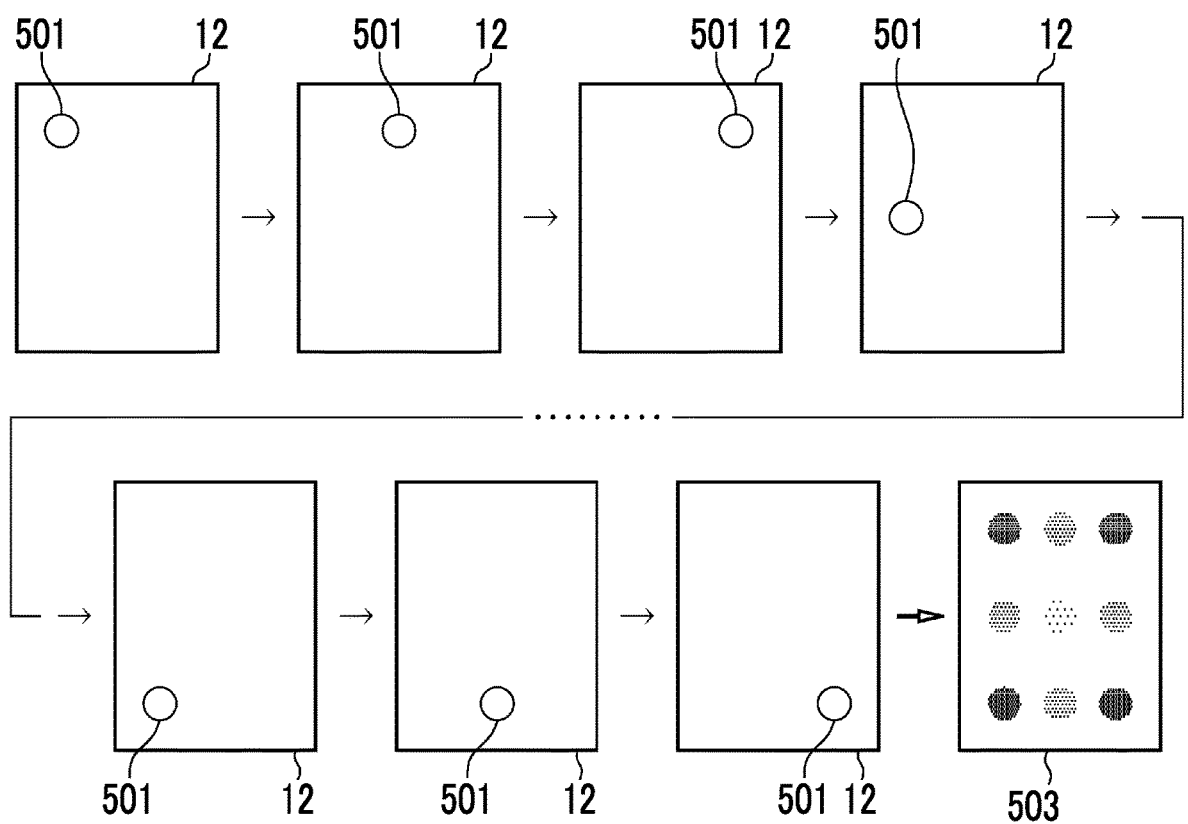
FIG. 20 is a diagram showing an aspect where a calibration image used for the settings and the like of blue shift correction is acquired.

The blue shift image 465 can be obtained as follows. For example, as shown in FIG. 20, a sample 501 including a specific fluorescent reagent is imaged at any position on the sample holder 12 using fluorescence emitted from the sample 501. The operator repeats imaging in the same manner while changing the position of a sample on the sample holder 12. Then, the operator combines images obtained from the imaging and obtains a composite image 503. After that, the operator can obtain the blue shift image 465 by performing the shading correction on the composite image 503.

The display unit 16 can display an image other than the blue shift image 465 in the image display field 460 on the setting operation screen 451. For example, the display unit 16 may display an image, which is not yet subjected to the shading correction, in the image display field 460 as necessary. Further, the display unit 16 may form the image of an artifact, which is to be corrected using the blue shift correction parameter 52 and display the image of the artifact in the image display field 460, as necessary.

Setting Operation in a Case Where Imaging is Performed

In a case where the fluorescence imaging device 10 is operated in a fluorescence imaging mode where a sample is imaged using fluorescence emitted from the sample, the display unit 16 displays an imaging condition-setting screen 601 that is one of operation screens as shown in FIG. 21. The imaging condition-setting screen 601 comprises, for example, a fluorescent reagent-selection field 611 and an information display field 612. The fluorescent reagent-selection field 611 displays the list of selectable fluorescent reagents by a pull-down menu 613. Accordingly, the fluorescent reagent-selection field 611 receives the selection of the fluorescent reagent included in the sample. Further, in a case where the operator selects the fluorescent reagent included in the sample in the fluorescent reagent-selection field 611, the control unit 44 automatically selects excitation light 80 and an optical filter 33, which are used for imaging, and a blue shift correction parameter 52 relating to the selected fluorescent reagent with reference to the storage unit 43 and then performs imaging using these in a case where an imaging instruction is given.

The information display field 612 includes, for example, an excitation light-display field 621, an optical filter-display field 622, and a blue shift correction parameter-display field 623. The excitation light-display field 621 displays the wavelength of excitation light 80 corresponding to the fluorescent reagent that is selected in the fluorescent reagent-selection field 611. The optical filter-display field 622 displays an optical filter 33, which corresponds to the fluorescent reagent selected in the fluorescent reagent-selection field 611, using, for example, the central wavelength of a wavelength range of light to be transmitted. Further, the blue shift correction parameter-display field 623 displays a blue shift correction parameter 52 corresponding to the fluorescent reagent selected in the fluorescent reagent-selection field 611.

As described above, the fluorescence imaging device 10 automatically selects excitation light 80, an optical filter 33, and a blue shift correction parameter 52 in a case where the operator selects the fluorescent reagent included in the sample. Accordingly, it is possible to easily obtain an accurate sample image by only specifying the fluorescent reagent included in the sample.

In the embodiment, the hardware structures of processing units, which perform various kinds of processing, such as the image acquisition unit 41, the image processing unit 42, and the control unit 44, are various processors to be described later. Various processors include: a central processing unit (CPU) that is a general-purpose processor functioning as various processing units by executing software (program); a graphical processing unit (GPU); a programmable logic device (PLD) that is a processor of which the circuit configuration can be changed after manufacture, such as a field programmable gate array (FPGA); a dedicated electrical circuit that is a processor having circuit configuration designed exclusively to perform various kinds of processing; and the like.

One processing unit may be formed of one of these various processors, or may be formed of a combination of two or more same kind or different kinds of processors (for example, a combination of a plurality of FPGAs, a combination of a CPU and an FPGA, a combination of a CPU and a GPU, or the like). Further, a plurality of processing units may be formed of one processor. As an example where a plurality of processing units are formed of one processor, first, there is an aspect where one processor is formed of a combination of one or more CPUs and software as typified by a computer, such as a client or a server, and functions as a plurality of processing units. Second, there is an aspect where a processor implementing the functions of the entire system, which includes a plurality of processing units, by one integrated circuit (IC) chip is used as typified by System On Chip (SoC) or the like. In this way, various processing units are formed using one or more of the above-mentioned various processors as hardware structures.

In addition, the hardware structures of these various processors are more specifically electrical circuitry where circuit elements, such as semiconductor elements, are combined. Further, the hardware structure of a storage unit is a storage device, such as a hard disc drive (HDD) or a solid state drive (SSD).

EXPLANATION OF REFERENCES

10: fluorescence imaging device
11: housing

12: sample holder
13: bottom
14: opening/closing part
16: display unit
21: well
22: microplate
31: light source unit
32: imaging unit
33: optical filter
41: image acquisition unit
42: image processing unit
43: storage unit
44: control unit
51: shading correction parameter
52: blue shift correction parameter
61: lens unit
62: imaging element
66: direct illumination light source
67: indirect illumination light source
80: excitation light
86: central portion
87: peripheral edge portion
101: shading image
121: graph
122: graph
230: image
301: sample image
302: shading correction
303: blue shift correction
304: sample image
401: setting operation screen
410: image display field
411: parameter setting field
413: first parameter field
414: second parameter field
416: automatic setting button
418: button
419: cancel button
451: setting operation screen
460: image display field
461: parameter setting field
465: blue shift image
471: light source-selection field
472: optical filter-selection field
473: automatic selection button
474: fluorescent reagent-specifying field
475: automatic input checkbox
476: blue shift correction parameter-input field
481: pull-down menu
482: pull-down menu
483: automatic detection button
486: first point
487: second point
491: OK button
492: cancel button
501: sample
503: composite image
601: imaging condition-setting screen
611: fluorescent reagent-selection field
612: information display field
613: pull-down menu
621: excitation light-display field
622: optical filter-display field
623: blue shift correction parameter-display field
A1: corner
A2: corner
C1: central portion
L1: imaging optical axis
Q1: pixel value
Q2: pixel value
V1: amount of fluorescence
V2: amount of fluorescence
V3: amount of fluorescence
V4: amount of fluorescence

What is claimed is:

1. A fluorescence imaging device comprising:
a processor configured to display an operation screen receiving an operation input on a display,
wherein the processor displays a setting operation screen on the display, the setting operation screen including a user interface which includes a parameter setting field in which a parameter relating to blue shift correction for correcting shade of a sample image caused by a difference in an incidence angle of fluorescence emitted from each sample simultaneously at each position where the fluorescence is incident on an optical filter is to be set in the parameter setting field of the user interface, and the processor performs the blue shift correction for correcting the shade of the sample image digitally based on at least the parameter received from the parameter setting field.

2. The fluorescence imaging device according to claim 1, wherein the setting operation screen includes a fluorescent reagent-specifying field in which a fluorescent reagent included in the sample is to be specified, and
the parameter relating to the blue shift correction is set for each fluorescent reagent.

3. The fluorescence imaging device according to claim 2, wherein the setting operation screen comprises an image display field in which the sample image not yet subjected to the blue shift correction is to be displayed.

4. The fluorescence imaging device according to claim 2, wherein the parameter is a ratio of a pixel value of a central portion of the sample image and a pixel value of a peripheral edge portion of the sample image.

5. The fluorescence imaging device according to claim 2, wherein the optical filter includes a dielectric multilayer film selectively transmitting light in a specific wavelength range that includes the fluorescence, and is disposed at a position where the fluorescence used for imaging is non-parallel light.

6. The fluorescence imaging device according to claim 2, wherein the processor displays an imaging condition-setting screen on the display, the imaging condition-setting screen including a fluorescent reagent-selection field receiving selection of the fluorescent reagent included in the sample.

7. The fluorescence imaging device according to claim 6, wherein in a case where the fluorescent reagent included in the sample is selected in the fluorescent reagent-selection field, excitation light with which the sample is to be irradiated, the optical filter that is to be used for imaging, and the parameter relating to the blue shift correction are automatically selected according to the selected fluorescent reagent.

8. The fluorescence imaging device according to claim 1, wherein the setting operation screen comprises an image display field in which the sample image not yet subjected to the blue shift correction is to be displayed.

9. The fluorescence imaging device according to claim 8, wherein the processor displays the sample image, which is not yet subjected to the blue shift correction, in the image display field in a case where the parameter is not yet set in the parameter setting field, and the processor displays the sample image, which has been subjected to the blue shift correction, in the image display field in a case where the parameter has been set in the parameter setting field.

10. The fluorescence imaging device according to claim 9, wherein the parameter is a ratio of a pixel value of a central portion of the sample image and a pixel value of a peripheral edge portion of the sample image.

11. The fluorescence imaging device according to claim 9, wherein the optical filter includes a dielectric multilayer film selectively transmitting light in a specific wavelength range that includes the fluorescence, and is disposed at a position where the fluorescence used for imaging is non-parallel light.

12. The fluorescence imaging device according to claim 8, wherein the parameter is a ratio of a pixel value of a central portion of the sample image and a pixel value of a peripheral edge portion of the sample image.

13. The fluorescence imaging device according to claim 8, wherein the optical filter includes a dielectric multilayer film selectively transmitting light in a specific wavelength range that includes the fluorescence, and is disposed at a position where the fluorescence used for imaging is non-parallel light.

14. The fluorescence imaging device according to claim 1, wherein the parameter is a ratio of a pixel value of a central portion of the sample image and a pixel value of a peripheral edge portion of the sample image.

15. The fluorescence imaging device according to claim 14, wherein the optical filter includes a dielectric multilayer film selectively transmitting light in a specific wavelength range that includes the fluorescence, and is disposed at a position where the fluorescence used for imaging is non-parallel light.

16. The fluorescence imaging device according to claim 1, wherein the optical filter includes a dielectric multilayer film selectively transmitting light in a specific wavelength range that includes the fluorescence, and is disposed at a position where the fluorescence used for imaging is non-parallel light.

17. The fluorescence imaging device according to claim 1, wherein the processor further configured to function as:
an image processing unit that performs shading correction for correcting shade of the sample image caused by characteristics of an imaging unit, which images the sample, and the blue shift correction on the sample image.

18. The fluorescence imaging device according to claim 17, wherein the image processing unit performs the blue shift correction and the shading correction on the sample image in stages in combination.

* * * * *